(12) United States Patent
Watts et al.

(10) Patent No.: US 9,802,317 B1
(45) Date of Patent: Oct. 31, 2017

(54) METHODS AND SYSTEMS FOR REMOTE PERCEPTION ASSISTANCE TO FACILITATE ROBOTIC OBJECT MANIPULATION

(71) Applicant: X Development LLC, Mountain View, CA (US)

(72) Inventors: Kevin William Watts, Palo Alto, CA (US); Ethan Rublee, Mountain View, CA (US); Kyle Lutz, San Mateo, CA (US); Hauke Malte Strasdat, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 188 days.

(21) Appl. No.: 14/695,166

(22) Filed: Apr. 24, 2015

(51) Int. Cl.
| G05B 19/04 | (2006.01) |
| B25J 9/16 | (2006.01) |
| G05B 19/402 | (2006.01) |

(52) U.S. Cl.
CPC .......... *B25J 9/1687* (2013.01); *B25J 9/1697* (2013.01); *G05B 19/402* (2013.01); *B25J 9/1676* (2013.01); *B25J 9/1679* (2013.01)

(58) Field of Classification Search
CPC ...... B25J 9/1687; B25J 9/1697; B25J 9/1979; B25J 9/1676; G05B 19/402; Y10S 901/47
See application file for complete search history.

(56) References Cited

U.S. PATENT DOCUMENTS

| 7,185,774 | B2 | 3/2007 | Colgate et al. |
| 8,794,181 | B2 | 8/2014 | Bareket |
| 9,050,723 | B1 | 6/2015 | Elazary et al. |
| 2001/0052708 | A1* | 12/2001 | Schmalz ............... B65G 47/91 294/65 |
| 2008/0004749 | A1 | 1/2008 | Hostettler |

(Continued)

FOREIGN PATENT DOCUMENTS

| WO | 9615481 A2 | 5/1996 |
| WO | 2014145471 A1 | 9/2014 |

OTHER PUBLICATIONS

"Interactive Perception: From Scenes to Objects", Niklas Bergstrom, KTH Royal Institute of Technology, SE, 2012.

(Continued)

*Primary Examiner* — Rachid Bendidi
(74) *Attorney, Agent, or Firm* — McDonnell Boehnen Hulbert & Berghoff LLP

(57) ABSTRACT

Methods and systems for remote perception assistance to facilitate robotic object manipulation are provided herein. From a model of objects in an environment of a robotic manipulator, a virtual boundary line separating two adjacent identified virtual objects may be identified. The robotic manipulator may be configured to perform a task involving a manipulation of at least one object in the environment represented by the identified virtual objects. Based on the identifying, a request for remote assistance with verifying the virtual boundary line may be sent to a remote assistor device. A response to the request, including a modification to the virtual boundary line, may then be received from the remote assistor device. The robotic manipulator may then be caused to perform the task based on the modification to the virtual boundary line.

23 Claims, 13 Drawing Sheets

(56) References Cited

U.S. PATENT DOCUMENTS

| | | | |
|---|---|---|---|
| 2012/0259462 A1* | 10/2012 | Aoba | B25J 9/1697 |
| | | | 700/245 |
| 2013/0041508 A1* | 2/2013 | Hu | B25J 9/162 |
| | | | 700/259 |
| 2013/0123980 A1 | 5/2013 | Seo | |
| 2013/0211593 A1* | 8/2013 | Domae | B25J 9/1612 |
| | | | 700/258 |
| 2013/0290234 A1 | 10/2013 | Harris et al. | |
| 2013/0345873 A1* | 12/2013 | Blumberg | B25J 9/0087 |
| | | | 700/259 |
| 2014/0025198 A1* | 1/2014 | Mattern | B25J 13/08 |
| | | | 700/228 |
| 2014/0163730 A1 | 6/2014 | Mian | |
| 2014/0277719 A1* | 9/2014 | Kamiya | B25J 9/1669 |
| | | | 700/253 |
| 2014/0365010 A1* | 12/2014 | Yasuda | G06K 9/00201 |
| | | | 700/259 |

OTHER PUBLICATIONS

Laput et al., "Zensors: Adaptive, Rapidly Deployable, Human-Intelligent Sensor Feeds".

* cited by examiner

METHODS AND SYSTEMS FOR REMOTE PERCEPTION ASSISTANCE TO FACILITATE ROBOTIC OBJECT MANIPULATION

BACKGROUND

Robotic systems, such as a robotic arm containing a gripping component, may be used for applications involving picking up or moving objects. For instance, a robotic device may be used to fill a container with objects, create a stack of objects, or unload objects from a given area. In some cases, all of the objects may be of the same type. In other cases, a container or truck may contain a mix of different types of objects, such as boxed items, cans, tires, or other objects of varying weights and sizes. Such robotic systems may direct a robotic arm to pick up objects based on predetermined knowledge of where objects are in the environment. Such robotic systems may also direct a robotic arm to pick up objects based on predetermined knowledge of what types of objects the robotic arm can manage (e.g., based on whether a gripper or other robotic manipulator can support a weight of the object while moving or otherwise interacting with the object at various accelerations).

SUMMARY

Example systems and methods may provide for requesting remote assistance from a remote assistor device in order to facilitate object manipulation by a robotic device. More specifically, a system configured to control a robotic manipulator may attempt to identify one or more objects that the robotic device will manipulate, such as boxes. In particular, the system may determine a virtual boundary line that distinguishes what the system perceives to be two adjacent objects in the environment, and then request remote assistance from the remote assistor device in order to verify whether the system has correctly distinguished the two objects. The system may then receive a response from the remote assistor device that modifies the virtual boundary line, indicating whether the virtual boundary line is correct (e.g., moves, adjusts, deletes, confirms validity of, etc. the virtual boundary line). The system may then instruct the robotic manipulator to manipulate the one or more objects in the environment based on information included in the response received from the remote assistor device.

In one aspect, the present application describes a computing system for controlling a robotic manipulator. The computing system may comprise at least one processor, and data storage comprising instructions executable by the at least one processor to cause the computing system to perform operations. The operations may include identifying, from a model of objects in an environment of the robotic manipulator, a virtual boundary line separating two adjacent identified virtual objects, where the robotic manipulator is configured to perform a task involving a manipulation of at least one object in the environment represented by the identified virtual objects. The operations may also include based on the identifying, sending, to a remote assistor device, a request for remote assistance with verifying the virtual boundary line separating the two adjacent identified virtual objects. The operations may further include receiving, from the remote assistor device, a response to the request including a modification to the virtual boundary line. The operations may still further include causing the robotic manipulator to perform the task based on the modification to the virtual boundary line.

In another aspect, the present application describes a method. The method may involve identifying, from a model of objects in an environment of the robotic manipulator, a virtual boundary line separating two adjacent identified virtual objects, where the robotic manipulator is configured to perform a task involving a manipulation of at least one object in the environment represented by the identified virtual objects. The method may also involve based on the identifying, sending, to a remote assistor device, a request for remote assistance with verifying the virtual boundary line separating the two adjacent identified virtual objects. The method may further involve receiving, from the remote assistor device, a response to the request including a modification to the virtual boundary line. The method may still further involve causing the robotic manipulator to perform the task based on the modification to the virtual boundary line.

In another aspect, the present application describes a remote assistor computing device for providing remote assistance to a control system of a robotic manipulator. The remote assistor device may comprise at least one input device, a display, at least one processor, and data storage comprising instructions executable by the at least one processor to cause the computing system to perform operations. The operations may include receiving, from the control system, a request for remote assistance with distinguishing at least one object in a model of objects in an environment of the robotic manipulator by verifying a virtual boundary line separating two adjacent identified virtual objects, where the robotic manipulator is configured to perform a task involving a manipulation of the at least one object in the environment represented by the identified virtual objects. The operations may also include in response to receiving the request, providing, on the display, a graphical user interface (GUI) representative of the model and the virtual boundary line. The operations may further include receiving, from the at least one input device, input data indicating a modification to the virtual boundary line. The operations may still further include sending, to the control system, a response to the request including the modification to the virtual boundary line.

In yet another aspect, a system is provided that includes a means for identifying, from a model of objects in an environment of a robotic manipulator, a virtual boundary line separating two adjacent identified virtual objects, where the robotic manipulator is configured to perform a task involving a manipulation of at least one object in the environment represented by the identified virtual objects. The system may also include a means for based on the identifying, sending, to a remote assistor device, a request for remote assistance with verifying the virtual boundary line separating the two adjacent identified virtual objects. The system may further include a means for receiving, from the remote assistor device, a response to the request including a modification to the virtual boundary line. The system may still further include a means for causing the robotic manipulator to perform the task based on the modification to the virtual boundary line.

In yet another aspect, a system is provided that includes a means for receiving, from a control system configured to control a robotic manipulator, a request for remote assistance with distinguishing at least one object in a model of the objects in an environment of the robotic manipulator by verifying a virtual boundary line separating two adjacent identified virtual objects, where the robotic manipulator is configured to perform a task involving a manipulation of the at least one object in the environment represented by the identified virtual objects. The system may also include a means for in response to receiving the request, providing, on the display, a graphical user interface (GUI) representative of the model and the virtual boundary line. The system may further include a means for receiving, from at least one input device, data and at least one control signal indicating a modification to the virtual boundary line. The system may still further include a means for sending, to the control system, a response to the request including the modification to the virtual boundary line.

The foregoing summary is illustrative only and is not intended to be in any way limiting. In addition to the illustrative aspects, implementations, and features described above, further aspects, implementations, and features will become apparent by reference to the figures and the following detailed description.

DETAILED DESCRIPTION

Figure 1A:
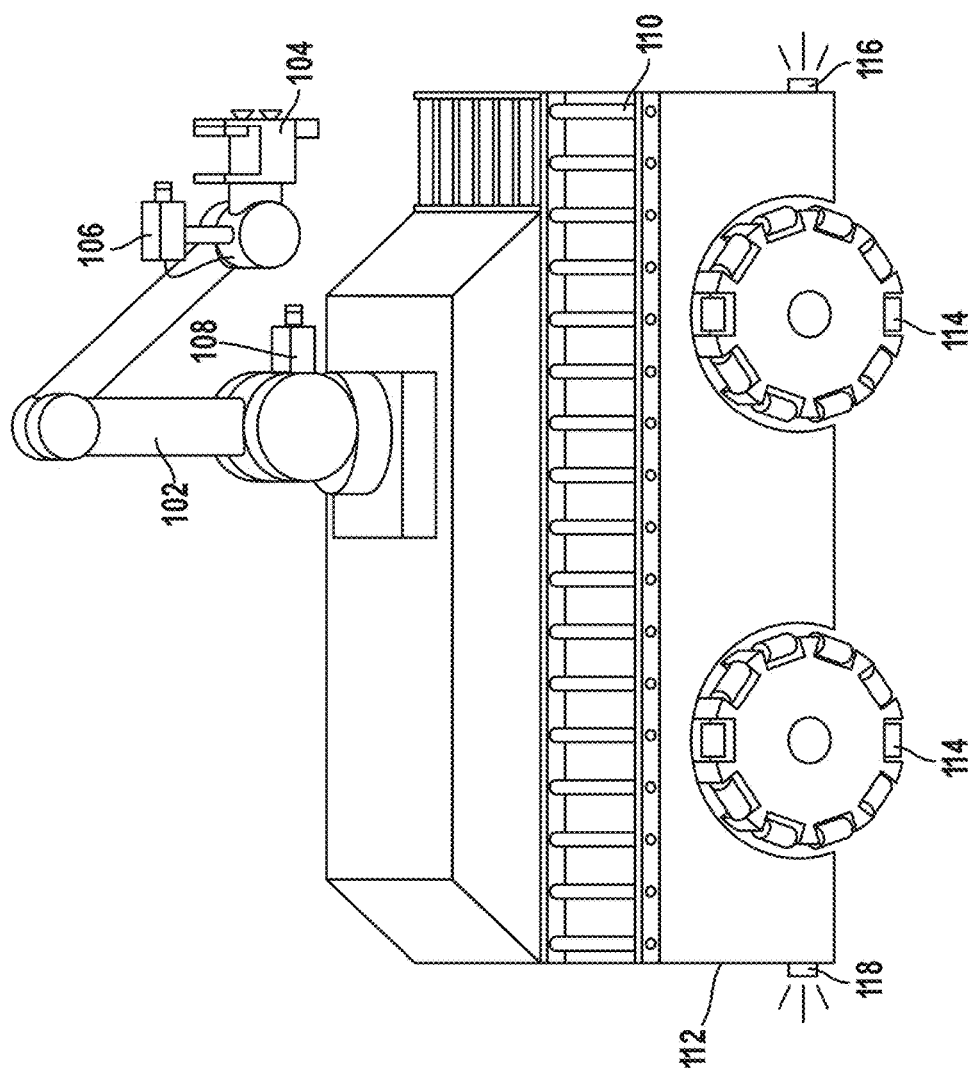
FIG. 1A shows a robotic arm mounted on a moveable cart, according to an example implementation.

Example methods and systems are described herein. Any example implementation or feature described herein is not necessarily to be construed as preferred or advantageous over other implementations or features. The example implementations described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other implementations might include more or less of each element shown in a given Figure. Further, some of the illustrated elements may be combined or omitted. Yet further, an example implementation may include elements that are not illustrated in the Figures.

In the following description, the terms "robotic device" and "robotic manipulator" may be used interchangeably to refer to a robotic device that is configured to manipulate (e.g., grab, move, drop, etc.) objects.

Further, the term "box" may refer to any object or item that can be placed onto a pallet or loaded onto or unloaded from a truck or container. For example, in addition to rectangular solids, "boxes" can refer to cans, drums, tires or any other "simple" shaped geometric items. Additionally, "boxes" may refer to totes, bins, or other types of containers which may contain one or more items for transport or storage. For instance, plastic storage totes, fiberglass trays, or steel bins may be moved or otherwise manipulated by robots within a warehouse. Examples herein may also be applied toward objects other than boxes as well, and toward objects of various sizes and shapes.

Still further, the terms "workplace" and "warehouse" may refer to any physical environment in which boxes or other objects may be manipulated, processed, and/or stored by robotic devices. In some examples, a warehouse may be a single physical building or structure, which may additionally contain certain fixed components, such as pallet racks for storing pallets of objects.

Yet still further, the terms "sensor," "camera," or "optical sensor" may be used interchangeably and may refer to device or devices (mono or stereo arrangements) configured to perform three-dimensional (3D) image sensing, 3D depth sensing, two-dimensional (2D) image sensing, 2D depth sensing (i.e., 2D image and corresponding depth map), and/or other types of sensing of a physical environment of the device.

An example arrangement includes a robotic device that occupies a physical workspace and a control system configured to control the robotic device. The robotic device may be a robotic manipulator arranged to manipulate objects in its workspace. In order to enable the robotic manipulator to manipulate such objects, the control system may first determine a model of the environment including the objects (e.g., a façade of boxes or other objects), and use the model to determine various types of information associated with the objects that will enable the robotic manipulator to interact with the objects. Such information may include an identification of the objects in the workspace (e.g., determining edges, corners, etc. of the objects and segmenting the objects, so as to distinguish the objects from each other). Once the objects are identified, the control system can then determine other related information such as where to grab the objects and/or an order in which to instruct the robotic manipulator to pick up each object in a group of objects, among other possibilities.

With this arrangement, scenarios may arise in which the control system may not be able to determine such information on its own, may determine incorrect information, or may be uncertain as to whether the information it has determined is sufficient for enabling the robotic manipulator to manipulate objects in the desired manner. In such scenarios, the control system may engage in a process in which the control system requests various types of remote assistance (e.g., human assistance) with certain tasks to perform, and uses feedback information received from remote assistors as a basis for instructing the robotic manipulator to perform each of those tasks.

As part of this process, the control system may identify a task with which the control system may need remote assistance. In particular, when the control system has a low confidence level in being able to correctly perform a given task, the control system may identify the given task as a task for which the control system should request remote assistance. As an example task, the control system may attempt to determine, from a model of various boxes present in the robotic manipulator's workspace, various "box hypotheses" (e.g., hypothesized edges, corners, borders, etc. of the boxes that correspond to the actual edges, corners, borders, etc. of the boxes in the workspace) so as to segment the model. If the control system is not confident that a particular box hypothesis is accurate, the control system may request remote assistance with confirming, rejecting, or adjusting the particular box hypothesis. Whereas, when the control system's confidence level for a particular box hypothesis is high, the control system may determine that no remote assistance is necessary.

The control system may request remote assistance for other tasks as well, in addition to or alternative to segmenting a model of objects. For example, the control system may request remote assistance for determining a sequenced order in which the robotic manipulator should manipulate the objects. As another example, the control system may request remote assistance for determining one or more locations on one or more of the objects at which the robotic manipulator should grab or otherwise interact with the object(s).

A given task for which the control system requests remote assistance may vary in granularity. For example, with respect to segmenting objects, and in accordance with the disclosed methods and systems, the control system may identify a virtual boundary line in the model rather than an entire box hypothesis, where the virtual boundary line separates/distinguishes two adjacent virtual objects that the control system has identified. However, while the virtual boundary line may correctly, or at least partially, correspond to an actual boundary (e.g., an edge, a corner, etc.) between two objects in the environment of the robotic manipulator in some scenarios, the virtual boundary line may not correctly correspond to an actual boundary in other scenarios. For example, when there is actually only one object present in the model, the control system may mistakenly identify two objects, which may be the result of the control system mistaking a crease or piece of tape of a box as an outer edge of the box, for instance.

After identifying a task for which remote assistance will be requested, the control system may then transmit a request remote assistance with the task to a remote assistor device. Herein, a "remote assistor device" may be a computing device operated by a human user through which the human user can provide feedback information in response to receiving the requests for remote assistance, such as a tablet computer, laptop computer, smartphone, and the like. Additionally or alternatively, a remote assistor device may be a remote automated computing system more powerful than the control system (e.g., more learned than the control system with respect to the identified tasks). Such a request may, for instance, take the form of a request for remote assistance with verifying (e.g., confirming, rejecting, modifying) one or more virtual boundary lines that the control system has identified.

Upon receipt of a given request from the control system, the remote assistor device may provide an interface that may enable the human user of the remote assistor device to provide a response to that request. For instance, in response to receiving a request, the remote assistor device may display the model and an identified virtual boundary line. The human user can then use the interface (e.g., a touch-screen, mouse, keyboard, and the like) to provide a response back to the control system that indicates a modification of the virtual boundary line, such as an adjustment to the location of the virtual boundary line. The interface may enable the human user to indicate a response with less granularity than adjusting a virtual boundary line, such as by providing the human user with a selectable option to cause the remote assistor device to send to the control system a simple approval of the control system's identified virtual boundary line, or by providing the human user with a selectable option to cause the remote assistor device to send instructions to the control system to rescan the model if the virtual boundary line is incorrect.

In scenarios where the control system requests human assistance with distinguishing objects, the interface may enable the human user to select or otherwise interact with, via the interface, virtual features important for robotic operation, such as virtual/visual indications of edges, corners, and/or surfaces of the objects, so that the human user (and thereby the control system) can detect edges, corners, etc. that correspond to locations of actual boundary lines between objects in the environment. By providing remote assistance, the human user (or a more powerful computer than the control system) can correct mistakes made by the control system, such as when the control system mistakenly detects tape, creases, or other features present on objects to be edges or other boundary lines between objects. This may be advantageous in that remote assistor feedback can enable the control system to learn from its mistakes and/or receive acknowledgement for its correct perception of objects in a timely, efficient manner.

After receiving the response from the remote assistor device, the control system may control the robotic manipulator to perform the given task in accordance with the response. For instance, if the response modifies the virtual boundary line to correctly correspond to an actual boundary between two objects in the environment, the robotic manipulator may pick up and move each of the two objects. Alternatively, if the response indicates that there is actually one object in the environment and represented by the model, the robotic manipulator may pick up and move the object, or the control system may rescan the object and update the model. Other examples are possible as well.

In line with the discussion above, example systems and methods may provide for requesting remote assistance from a remote assistor device in order to facilitate object manipulation by a robotic device. More specifically, a system configured to control a robotic manipulator may attempt to identify one or more objects that the robotic device will manipulate, such as boxes. In particular, the system may determine a virtual boundary line that distinguishes what the system perceives to be two adjacent objects in the environment, and then request remote assistance from the remote assistor device in order to verify whether the system has correctly distinguished the two objects. The system may then receive a response from the remote assistor device that modifies the virtual boundary line, indicating whether the virtual boundary line is correct. For instance, if there is actually one object in the environment and the system perceived there to be two, the response may indicate that the virtual boundary line should be removed. Alternatively, if there are two objects in the environment, but the system's virtual boundary line does not correspond to the actual boundary between the two objects, the response may indicate that the virtual boundary line should be modified to correspond to the actual boundary. Other scenarios in which the system may request remote assistance are possible as well.

Reference will now be made in detail to various implementations, examples of which are illustrated in the accompanying drawings. In the following detailed description, numerous specific details are set forth in order to provide a thorough understanding of the present disclosure and the described implementations. However, the present disclosure may be practiced without these specific details. In other instances, well-known methods, procedures, components, and circuits have not been described in detail so as not to unnecessarily obscure aspects of the implementations.

While some robotic devices may be fixed at a location in an environment, in some implementations, a robotic device can be made mobile by coupling the robotic device with a wheeled base, a holonomic base (e.g., a base that can move in any direction), or rails on the ceiling, walls or floors. According to various implementations, a robotic manipulator may be mounted on a holonomic base (e.g., a base with wheels that allow the base to move in any direction). FIG. 1A depicts an exemplary holonomic base containing a robotic manipulator. In some implementations, a moveable base 112 may include a robotic arm 102 mounted on the base 112. The robotic arm 102 may contain a gripping component 104 for gripping objects within the environment. The base may contain one or more wheels 114, which may be holonomic wheels that operate with two degrees of freedom. In further implementations, a wraparound front conveyor belt 110 may be included on the holonomic base 112. In some examples, the wraparound front conveyer belt 110 may allow the robot to not have to rotate its gripper to the left or right when unloading or loading boxes from or to a truck container or pallet.

In other examples, the robotic manipulator may be mounted on a different type of movable apparatus or may not be mounted on a movable base at all. For example, the robotic manipulator may be mounted at a fixed position within a factory setting. In still other examples, one or more robotic manipulators may be mounted on rails of a truck or container. In such examples, the robotic manipulators may be used to load or unload the truck or container.

Figure 1B:
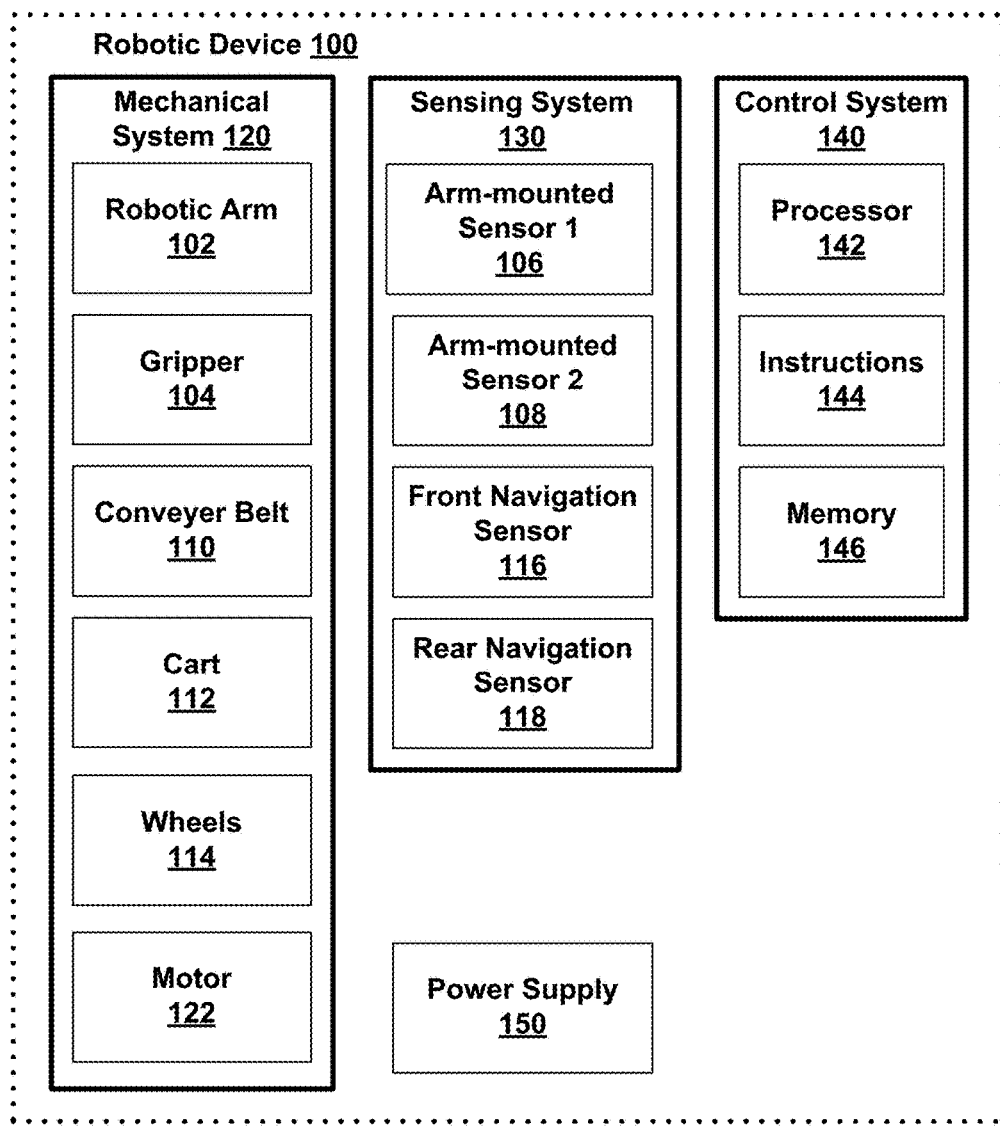
FIG. 1B is an operational block diagram illustrating a robotic device, according to an example implementation.

FIG. 1B is a functional block diagram illustrating a robotic device 100, according to an example implementation. The robotic device 100 could include various subsystems such as a mechanical system 120, a sensing system 130, a control system 140, as well as a power supply 150. The robotic device 100 may include more or fewer subsystems and each subsystem could include multiple elements. Further, each of the subsystems and elements of robotic device 100 could be interconnected. Thus, one or more of the described operations of the robotic device 100 may be divided up into additional operational or physical components, or combined into fewer operational or physical components. In some examples, additional operational and/or physical components may be added to the examples illustrated by FIGS. 1A and 1B.

The mechanical system 120 may include components described above with respect to FIG. 1A, including a robotic arm 102, a gripper 104, a conveyer belt 110, a (movable or holonomic) base 112, and one or more wheels 114. The mechanical system 120 may additionally include a motor 122, which may be an electric motor powered by electrical power, or may be powered by a number of different energy sources, such as a gas-based fuel or solar power. Additionally, motor 122 may be configured to receive power from power supply 150. The power supply 150 may provide power to various components of robotic device 100 and could represent, for example, a rechargeable lithium-ion or lead-acid battery. In an example implementation, one or more banks of such batteries could be configured to provide electrical power. Other power supply materials and types are also possible.

The sensing system 130 may use one or more sensors attached to a robotic arm 102, such as sensor 106 and sensor 108, which may be 2D sensors and/or 3D depth sensors that sense information about the environment as the robotic arm 102 moves. The sensing system 130 may determine information about the environment that can be used by control system 140 (e.g., a computer running motion planning software) to pick and move boxes efficiently. The control system 140 could be located on the device or could be in remote communication with the device. In further examples, scans from one or more 2D or 3D sensors mounted on a mobile base, such as a front navigation sensor 116 and a rear navigation sensor 118, and one or more sensors mounted on a robotic arm, such as sensor 106 and sensor 108, may be integrated to build up a digital model of the environment, including the sides, floor, ceiling, and/or front wall of a truck or other container. Using this information, the control system 140 may cause the mobile base to navigate into a position for unloading or loading objects, for instance.

Within examples, the robotic arm 102 may be equipped with a gripper 104, such as a digital suction grid gripper. In such implementations, the gripper may include one or more suction valves that can be turned on or off either by remote sensing, or single point distance measurement and/or by detecting whether suction is achieved. In additional examples, the digital suction grid gripper may include an articulated extension. In some implementations, the potential to actuate suction grippers with rheological fluids or powders may enable extra gripping on objects with high curvatures. Other types of grippers are possible as well.

In some implementations, the gripper could potentially span several boxes or objects and turn on suction for some or all of the covered objects. In some implementations, the suction or adhesion devices may be a "digital" grid so that the robotic device can turn on any number of the suction devices as will fit boxes sensed for grabbing. In some implementations, the system may notice a seam in the boxes (separation between adjacent boxes) such that suction devices can be activated on both sides of the seam to pick up both boxes at once, thereby doubling the throughput. In some implementations, the suction devices can sense after a certain amount time whether they can successfully grip a surface, after which they may automatically shut off. In further implementations, sections of the suction devices can fold down to grasp the top of the boxes. For instance, grippers can initially start at full extension and then conform to the surface being gripped.

In further examples, the robotic arm can implement a wiggle movement to improve a suction grip. In additional implementations, the robotic arm can wiggle a box side-to-side to help segment the box from its surroundings. In other implementations, the arm can wiggle upon pick up of the box to avoid jostling other objects. In such implementations, when trying to adhere to an object in order to pick it up using suction, the robotic arm may employ a wiggle motion in order to make a firm seal against the object. In further examples, the robotic arm may wiggle the object as the robotic arm is picking up the object so that the box can more gently break friction or overlap contact with other items. This may help avoid a situation where pulling the object up too directly or too quickly causes other items to be tossed into the air. According to various implementations, physical objects can have concave, convex or otherwise rumpled faces that make it hard for a suction device to adhere to. Thus, wiggling the suction device as the device makes suction contact may enable a more reliable grip on physical objects, both planar and non-planar objects.

In other examples, one or more of the sensors used by a sensing system may be a RGBaD (RGB+active Depth) color or monochrome camera registered to a depth sensing device that uses active vision techniques such as projecting a pattern into a scene to enable depth triangulation between the camera or cameras and the known offset pattern projector. This type of sensor data may help enable robust segmentation. According to various implementations, cues such as barcodes, texture coherence, color, 3D surface properties, or printed text on the surface may also be used to identify an object and/or find its pose in order to know where and/or how to place the object (e.g., moving the object slowly due to the object being fragile). In some implementations, shadow or texture differences may be employed to segment objects as well.

Many or all of the operations of robotic device 100 could be controlled by control system 140. Control system 140 may include at least one processor 142 (which could include at least one microprocessor) that executes instructions 144 stored in a non-transitory computer readable medium, such as the memory 146. The control system 140 may also represent a plurality of computing devices that may serve to control individual components or subsystems of the robotic device 100 in a distributed fashion.

In some implementations, memory 146 may contain instructions 144 (e.g., program logic) executable by the processor 142 to execute various operations of robotic device 100, including those described above in connection with FIGS. 1A-1B. Memory 146 may contain additional instructions as well, including instructions to transmit data to, receive data from, interact with, and/or control one or more of the mechanical system 120, the sensor system 130, and/or the control system 140.

Figure 2A:
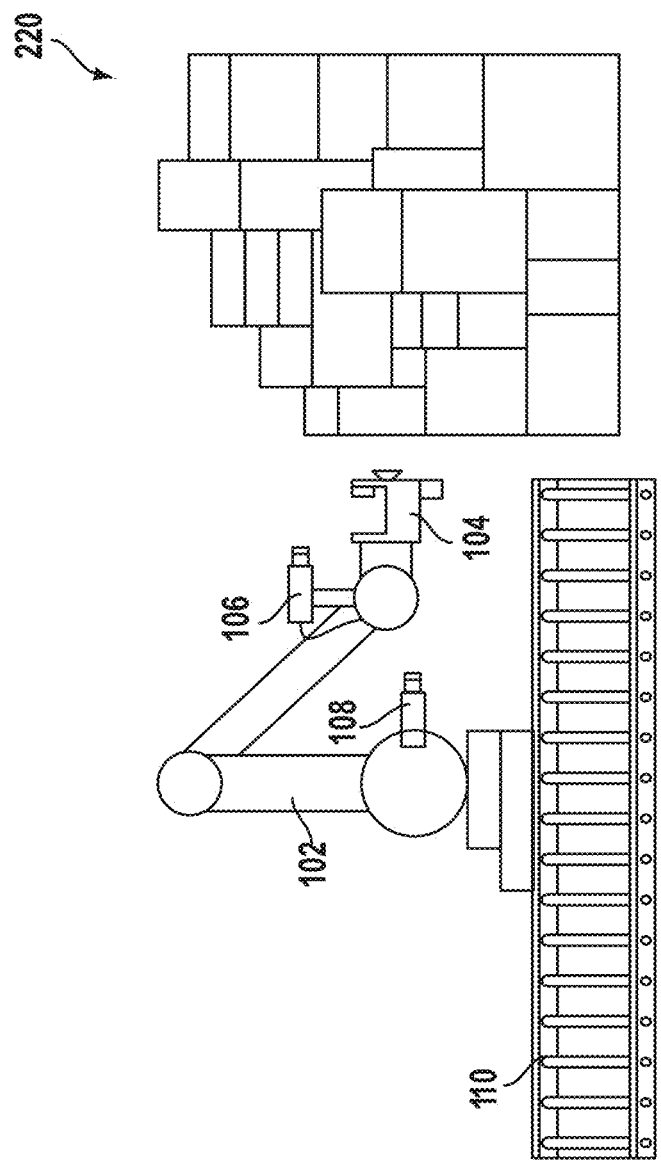
FIG. 2A shows a robotic arm and a stack of boxes, according to an example implementation.

According to various implementations, a perception guided robot is described. For instance, a robotic device may utilize a combination of perception together with planning to guide the robot arm to pick up a box and place the box where it needs to go. FIG. 2A illustrates part of the robotic device from FIG. 1A with a stack of boxes, according to an example implementation. As shown, the robotic device may include a robotic arm 102 with a gripping component 104, sensors 106 and 108, and conveyer 110 as described above. In some examples, the robotic device could be mounted on a holonomic base as described with respect to FIG. 1A, could be mounted on a different type of movable apparatus, could be mounted on rails or tracks, or could be stationary. The robotic device may be controlled to pick boxes from a stack of boxes 220 containing a heterogeneous mix of shapes and sizes of boxes.

Figure 2B:
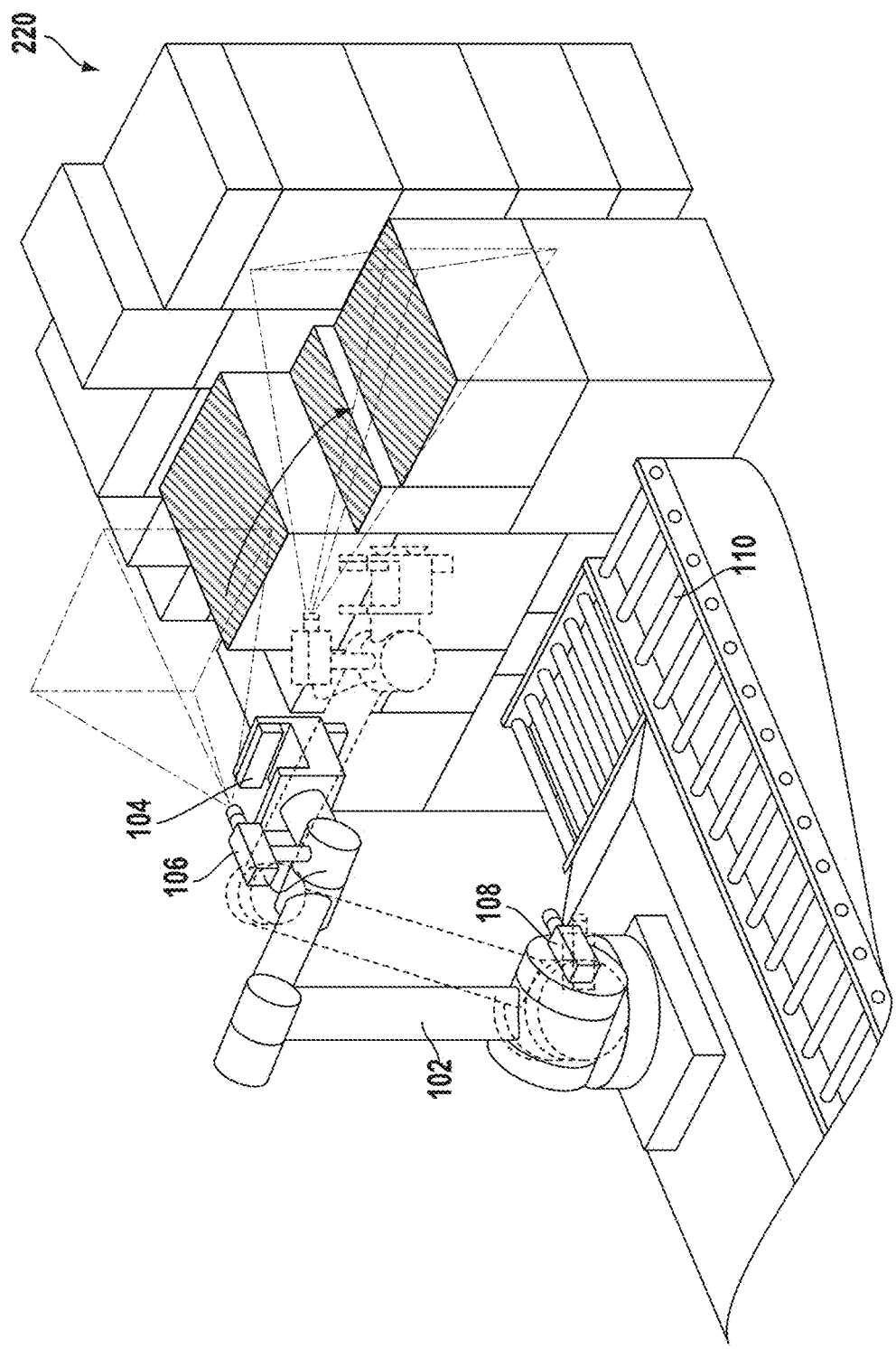
FIG. 2B shows scanning of the stack of boxes from FIG. 2A by a sensor mounted on the robotic arm, according to an example implementation.

Within examples, a virtual environment including a model of the objects in 2D and/or 3D may be determined and used to develop a plan or strategy for picking up the boxes. In some examples, the robot may use one or more sensors to scan an environment containing objects, as shown in FIG. 2B. As the robotic arm 102 moves, a sensor 106 on the arm may capture sensor data about the stack of boxes 220 in order to determine shapes and/or positions of individual boxes. In additional examples, a larger picture of a 3D environment may be built up by integrating information from individual (e.g., 3D) scans. Sensors performing these scans may be placed in fixed positions, on a robotic arm, and/or in other locations. According to various implementations, scans may be constructed and used in accordance with any or all of a number of different techniques.

In some examples, scans can be made by moving a robotic arm upon which one or more 3D sensors are mounted. Feedback from the arm position may provide pose information about where the sensor is positioned and may be used to help with the integration. Alternately, or additionally, scans may be made using one or more 2D sensors, for instance by leveraging motion and tracking key-points in the environment. In further examples, scans may be from fixed-mount cameras that have fields of view (FOVs) covering a given field. In additional examples, scans may be visually registered to help with fine pose estimation, potentially giving better integration results.

In further examples, a virtual environment may be built up using a 3D volumetric or surface model to integrate information (e.g., from different sensors). This may allow the system to operate within a larger environment, such as in cases where one sensor may be insufficient to cover a large environment. Such techniques may also increase the level of detail captured, which may help the robotic device perform various tasks. In particular, integrating information can yield finer detail than from a single scan alone (e.g., by bringing down noise levels). This may enable better object detection, surface picking, or other applications.

In further examples, wide-angle environment reconstruction may be performed by sensing an environment and extracting that information into a simplified geometric model of simple mathematical 3D geometric forms (e.g., planes, cylinders, cones, hemispheres, etc.). In some instances, such techniques may make motion planning easier and/or may make violation of the models (e.g., collisions) easier to detect. Alternately, or additionally, such techniques may allow a parametric description to extend the environment. For instance, the ground may be treated as a plane that extends behind objects that occlude it.

In additional examples, planes or other mathematical surfaces in the environment may be extracted in 3D. These known "ideal" surface detections may be combined into a more accurate model of the environment. For instance, planes may be used to determine the full extents of walls (or mathematical description thereof) and other obstacles to avoid collisions and detect the locations of objects of interest. Also, mathematical representations of objects may be used to look for anomalies such as a person entering into an environment. Such events may violate the ideal model, which may make their detection easier.

In other examples, certain objects such as boxes may have simple planar form. For instance, a metal object may have a geometric form of a cylinder and a tire may have a geometric form of a torus. Example systems may leverage this trait of certain objects in order to model them and/or determine how to motion plan for the objects. For instance, known templates of certain shapes can be used to refine detected features of objects within the environment that appear to match a particular shape.

In some examples, 2D and 3D information may be represented at least in part via one or more facades. A facade may be defined as a near-planar construct containing a set of objects, represented as a depth map (e.g., a 2D map with distances as a third dimension). Examples of facades may include a wall of boxes in a truck, a top of a pallet stack containing boxes or other objects, or a top of a bin of jumbled objects.

In further examples, a facade may be constructed from boxes, for instance to plan an order for picking up the boxes.

Figure 2C:
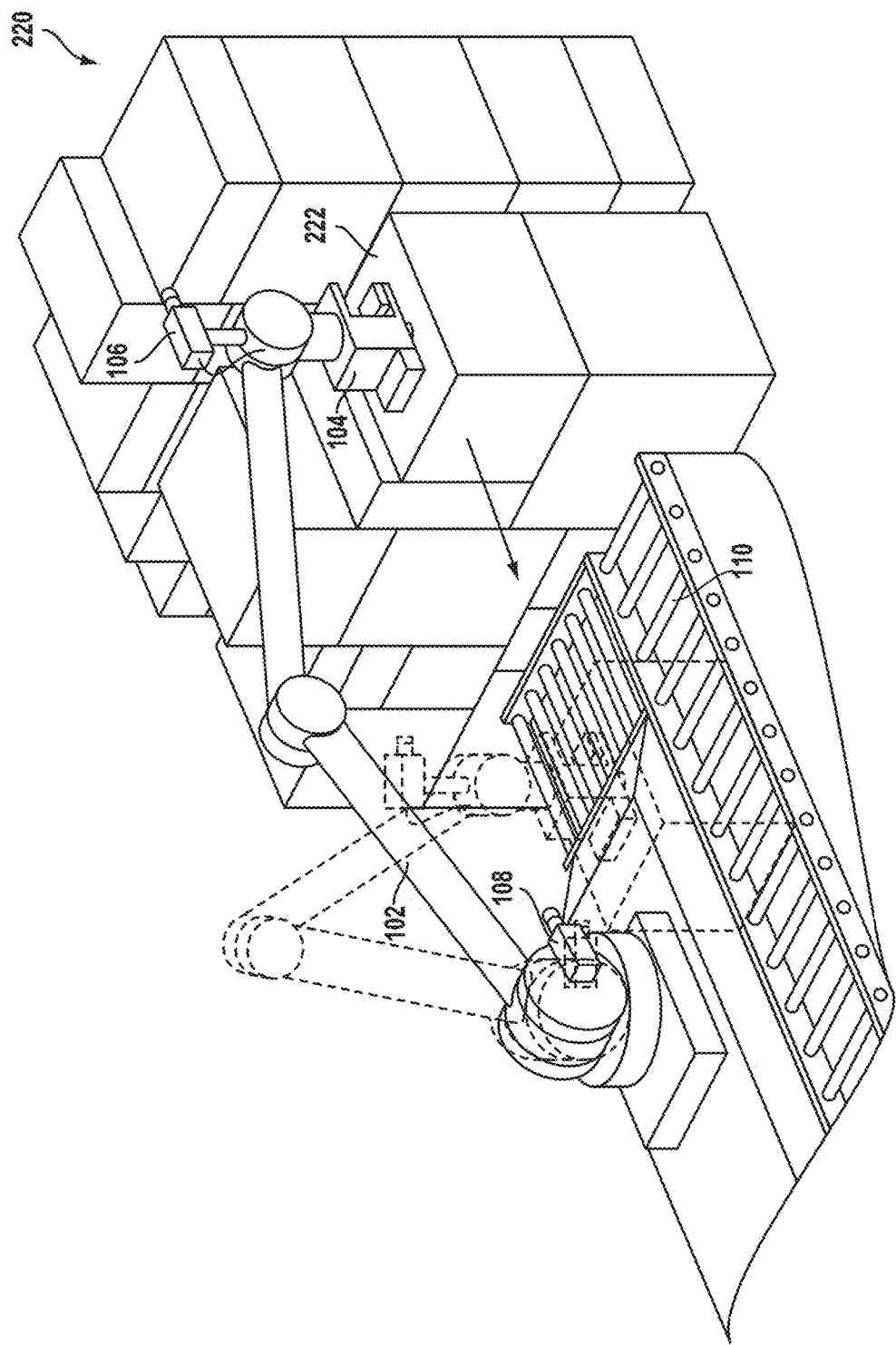
FIG. 2C shows the robotic arm from FIG. 2A moving a box, according to an example implementation.

For instance, as shown in FIG. 2C, box 222 may be identified by the robotic device as the next box to pick up. Box 222 may be identified within a facade representing a front wall of the stack of boxes 220 constructed based on sensor data collected by one or more sensors, such as sensors 106 and 108. A control system may then determine that box 222 is the next box to pick, possibly based on its shape and size, its position on top of the stack of boxes 220, and/or based on characteristics of a target container or location for the boxes. The robotic arm 102 may then be controlled to pick up the box 222 using gripper 104 and place the box 222 onto the conveyer belt 110 (e.g., to transport box 222 into a storage area).

In additional examples, a facade may be represented as an orthographic projection of 3D surface information. This representation may allow for parsing the facade to determine interesting areas for a particular application. For example, in truck unloading, the upper left corner of the next box to pick up may be determined based on a facade representation. In other examples, an orthographic projection of an integrated 3D environment may be determined to give a wide-FOV, easily-parsed representation for performing application-related tasks. One such task may be finding the corner or corners (e.g., top left) of a box to pick. Another such task may involve finding good surfaces (e.g., relatively flat and large) for picking objects out of a bin.

In further examples, a 3D model of a stack of boxes may be constructed and used as a model to help plan and track progress for loading/unloading boxes to/from a stack or pallet. Any one actual camera view of the facade may suffer from point of view occlusions and perspective distortion. Accordingly, multiple RGBD views via robot arm movements and/or different views from a base or fixed locations may be combined to create a single facade of the boxes to be picked.

In other examples, the 3D model may be used for collision avoidance. Within examples, planning a collision-free trajectory may involve determining the 3D location of objects and surfaces in the environment. A trajectory optimizer may make use of the 3D information provided by environment reconstruction to optimize paths in the presence of obstacles. In further examples, the optimizer may work in real time and may accept many kinds of constraints. As an example of such a constraint, the optimizer may attempt to keep the end effector level throughout the trajectory.

In additional examples, an environment may be captured as a mesh or set of 3D points. A robot arm may be represented as a convex hull of plane segments for quick collision checking. Constant or frequent updating of the environment may allow the robot arm to quickly respond to changes. In further examples, an optimizer may perform frequent continuous collision checking throughout its path. An optimizer may accept arbitrary constraints in the form of costs, such as to keep a certain distance away from objects or to approach a goal position from a given angle. Additionally, an optimizer may avoid robot fault conditions by working in joint space, keeping track of windup and choosing goal positions from among multiple inverse kinematics solutions. One strategy for motion planning may involve looking ahead several moves to see if the chosen goal joint position will be acceptable for the next move.

In some implementations, path constraints, such as collision avoidance for robotic arms, cameras, cables, and/or other components, may be put in a constraint based planning solver and solved for to yield a best path to move the arm for perception. Additionally, in some implementations, the solver may determine a best path for picking up, moving, and placing an object.

In order to determine a virtual reconstruction of a physical environment of a robotic manipulator, a computing device or system may receive one or more images of one or more objects in the physical environment, such as boxes. The images of the objects may be captured by one or more sensors in sequence at various poses (i.e., positions and orientations) of the sensor(s) and/or of the objects themselves. Thus, respective images may correspond to respective different views of the objects. The images may be of various types, such as color/intensity images, gradient images, and depth map images (i.e., images representative of distances between respective surfaces of the objects and a reference plane associated with a perspective of the sensor(s) that capture the images), among other possibilities. As noted above, the objects may take the form of cuboid-shaped (or other shaped) objects, such as boxes, that are stacked in or otherwise occupy the physical environment, for instance.

In some examples, the one or more images may include various facades of a stack of boxes (i.e., a near-planar group of boxes) from different viewpoints. For instance, when the physical objects are a stacked pallet of boxes in the physical environment, the images may include at least one side view facade of the stacked pallet of boxes, at least one top-down view facade of the stacked pallet of boxes, and/or other variations on these viewpoints (i.e., perspective views). In some implementations, one frontal view or one top view of stacked boxes may be used.

After receiving the one or more images, the computing device or system may virtually reconstruct the physical environment based on the one or more images, a pose of the sensor(s) used to capture the images, and in some scenarios, additionally or alternatively based on other information obtained by sensors such as depth and visual cameras. A reconstruction of the environment may facilitate operations relating to object segmentation, including but not limited to operations described herein. A reconstruction of the environment may be represented, for example, as a point representation, surface representation, or volumetric representation. In one particular example, the computing device may reconstruct the environment in 3D using a volumetric device, such as a Truncated Signed Distance Function (TSDF), which allows for efficient integration of depth images for a wider FOV and lower noise. Generally, the TSDF reconstruction of the environment comprises implicit information about the surfaces present in the volume.

In some examples, a TSDF volume may comprise a regular 3D grid containing a signed scalar field indicating the distance to the nearest depth point. For each depth pixel in an input image, a projected ray may be averaged into the volume, with a zero value in the cell exactly at the 3D position of the depth pixel, where positive values are closer to the camera along the ray, and negative values are further away from the camera. The computing device may integrate together successive depth images that are registered to this volume. In such examples, the computing device may add information from a visual camera as well, in addition to the depth information, as noted above. To facilitate this, the visual camera may be calibrated in accordance with the depth camera, and the depth image may be re-projected to the frame of the visual camera so that their images correspond to the same (visual camera) viewpoint. Then, at cells in the volume along the projecting ray from the depth pixel that lie within a threshold distance from the zero value cell, visual RGB information may also be averaged into the volume cells along the ray.

As a further example aspect of volume reconstruction, each cell may also include information about whether that cell occurs at the edge of the projected depth/visual image. In a scenario where the computing device re-projects the volume to a height map, such information may be used to determine where there are "false edges" in the height map (i.e., edges that arise from the aperture edges of the input images).

As a further example aspect of volume reconstruction, the computing device may take into account a confidence in the depth reading. For instance, readings that are further away from the camera, or that strike a surface at a glancing angle, are discounted by the computing device. As such, more confident information may have more of an effect during integration, which may improve the quality of the environment reconstruction.

In some aspects, the computing device may also subtract information, for example, when an object is removed or the environment changes for any other reason, and when new information contradicts the old information. The TSDF may handle situations such as this by gradually averaging in the new information, which can take a significant number of new views before older, invalid surfaces are removed.

To facilitate quick removing of information, the computing device may implement one or more methods. In a first method, the computing device may have predetermined that it will be loading, unloading, or otherwise interacting with an object such as a box. For instance, the computing device may know a region of the box (e.g., the coordinates and dimensions of the box), and may erase this region from the TSDF volumetric representation, setting the region to a zero state. This erasure may cause errors, and thus, the computing device may gradually smooth the outlines of the removed box. In a second method, the computing device may enforce a strong erasure constraint on each ray that is projected into the volume. Instead of just changing the TSDF volumetric representation in the vicinity of the 3D depth point, the computing device may zero out all cells along the ray, from the camera to a certain distance in front of the 3D depth point. Such a process may cause the environment to change much more rapidly in dynamic situations, without ruining the integration of areas that are stable. Other example methods for quickly removing information from images are possible as well.

In some scenarios, the computing device may need to extract either points or explicit surface information as the input to other algorithms (e.g., obstacle avoidance applications). To facilitate this, the computing device may implement one or more of several different algorithms. For instance, the computing device may project the TSDF volumetric representation onto a planar surface in the form of a height map, the height map being an image whose pixel values represent the distance of the nearest surface along a ray perpendicular to the surface (for orthographic projection), or through a focal point (pinhole projection).

In addition to the height map, the computing device can obtain a similar visual map by projection, since the TSDF volumetric representation contains RGBD values at each cell. Such a visual map may take the same format as the height map. Information in the height map may be color-coded by depth.

In an example application of height maps, the computing device may determine the location of boxes in the physical environment. Every face of a rectangular-sided box may be a planar segment that projects onto an orthographic height map as a parallelogram or other shape. Thus, in order for the computing device to find rectangular box faces, the computing device may look for parallelograms in the height map using line segments from both visual and depth height maps, or using other methods.

As noted above, the TSDF or other 3D volumetric representation of the physical environment may be orthographically projected as height maps (e.g., an X-Y plane height map or a Y-Z plane height map), thereby resulting in a projected color/intensity image, a projected depth image, and a projected normal image of the environment. Some or all of the 3D data points (i.e., 3D point cloud) that make up the volumetric representation may be projected two-dimensionally onto a reference plane associated with the perspective of the sensors that captured the images used for generating the volumetric representation. For instance, the reference plane may be substantially orthogonal to a surface on which the physical objects are placed and/or substantially parallel to a nearby wall or other vertical surface in the physical environment. The reference plane may intersect some or all of the physical objects of the environment, or may be separate from the objects (i.e., behind the objects, such as parallel to a nearby wall). In other examples, the reference plane may be angled and orthogonal to a sightline of one or more of the sensors when the given sensor viewpoint of the facade is a perspective viewpoint.

In some examples of detection and segmentation of physical objects—boxes, in particular—the computing device may identify line, corner, contour and plane features, and use these features in accordance with a method for box hypotheses generation. Such a method may use the orthographic projections of the depth, the normal, and the color/intensity image generated from a 3D virtual reconstruction of an environment. In these orthographic projections, boxes are observed as quadrilaterals, or parallelograms in particular. Such a method may involve operations such as: preprocessing orthographic images, extracting corner features and line features (e.g., line segments) from the preprocessed images, building initial reasonable hypotheses from combinations of line segments, combinations of corners, single planes, and corner-contours, refining the initial hypotheses, filtering out hypotheses with threshold high probability of being associated to a distinct object/surface, removing hypotheses that (i) have more than one plane on which the hypotheses lie on, (ii) contain a significant portion of the background of the physical environment, and (iii) are identical, and performing global reasoning based on assumptions and predictions that a given set of physical objects may not overlap.

Such a method should not be limited to these operations. For instance, some implementations may involve reweighting the probability of box hypotheses based on other detectable features that boxes or other physical objects may include. Other operations are possible as well.

In some implementations, such a method may be divided into different modules which may be processed in successive order. The modules may be associated with one or more of the operations described above. For example, at the first module, a data preprocessing module, all planes which are skewed beyond a given threshold with respect to the one or more optical sensors may be filtered out. A plane associated with the floor on which the boxes are placed may also be filtered out. Then, the computing device may compute a multi-channel edge image for template matching that incorporates the orthographic normal, color/intensity and depth projection image (e.g., normal, color and depth maps) from the reconstructed 3D virtual environment. This may result in a multi-modal gradient orientation image and a corresponding magnitude image. To compute an edge map, the computing device may implement different weighting of the modalities. After computation of the edge map, the computing device may compute all the line, corner, contour, and plane features mentioned above using the normal, color, depth, multi-modal orientation and magnitude images.

At the next module, a box hypothesis generation module, one or more different types of box hypotheses generation approaches may be used. Each approach may use some basic dimension constraint checks initially, which check if a box violates predefined dimensions. If so, that box may be removed. One approach may be box hypothesis by plane feature. In this approach, the computing device may construct a parallelogram that is made up by one plane found within the current scene. If the plane is well explained by the box, and the box is at least partially covered by the plane, that plane may be used as a potential box hypothesis.

In another approach, box hypothesis may be performed using two diagonal opposite corner features. Namely, two diagonal opposite corner features that lie on the same plane may provide all necessary information to build up a parallelogram (by using the corner locations and their respective orientation of their four corner "arms" in total). As such, the computing device may use the underlying gradient orientation and magnitude values to optimize the orientation of the corner arms.

In still another approach, box hypothesis may be performed using two opposite corner features and a contour. Namely, two opposite corner features that lie on the same plane may serve as one baseline. This baseline and the corresponding opposite contour of the plane may serve as two parallel sides of a parallelogram. The other two sides may be provided by the intersection of the corner feature arms which are not incorporated into the baseline and the contour line. The result of the four sides may make up a particular parallelogram. The box hypothesis may consist of one previously detected plane, and may be invalid if there is more than one previously detected plane.

In yet another approach, box hypothesis may be performed using four line features. Namely, four line segments which are approximately perpendicular in 3D may comprise a parallelogram. Each line segment may be required to cover at least a certain percentage of the corresponding border of the resulting parallelogram in order for the computing device to determine that the given box hypothesis is valid. The box hypothesis may consist of one previously detected plane, and may be invalid if there is more than one previously detected plane.

At the next module, a verification and refinement module, the computing device may verify and refine each of the generated box hypotheses based on at least a portion of the available data and known constraints. In one example, the computing device may verify and refine a box hypothesis that was created by two diagonal corner features. In this example, the computing device may create a band around each side of the parallelogram that was created, where every possible line in the band may be evaluated. For each of those lines, the computing device may compute similarity scores (i.e., "verification scores") based on a dot product of the normal of the line and the computed multi-modal gradient noted above. Finally, the computing device may select one parallelogram out of all possible parallelograms where the sum of the similarity scores is maximal under all parallelograms. If the best parallelogram is above a certain threshold, the computing device may process it further. Otherwise, that parallelogram may be rejected. This similarity score may be used later as a confidence score during global reasoning.

In another example, the computing device may verify and refine a box hypothesis that was created by a plane. In this example, the computing device may apply the same verification score method as noted above with respect to the previous example. However, all box hypotheses that are rejected may not be discarded, but rather still used with a low confidence value.

In still another example, the computing device may verify and refine a box hypothesis that was created by two opposite corner features and a contour. First, the computing device may optimize the baseline by computing every possible line within a band around the baseline and using the line which is best supported by the data (as in the first verification example). Next, the computing device may project a location of the two corner features onto the optimized baseline in order to obtain a start and an end point. Then, the computing device may use that line and the corresponding normal of the underlying plane to recompute the orientation of the template arms (i.e., the segments extending from each corner). The intersection of the two new template arms and the contour may serve as two adjacent lines to the baseline. Both of those adjacent lines may also be refined (similar as the baseline). Their average intersection with the contour gives a parallelogram. The confidence value of this refined box is the similarity score of the baseline and the two adjacent lines. Using this method of verification, the computing device may reject such a refined box if the similarity score is too low or the fourth line is not much supported by the contour pixels (i.e. the contour pixels are too far away from the constructed fourth line). This similarity score may be used later as a confidence score during global reasoning.

In yet another approach, the computing device may verify and refine a box hypothesis that was created by four line segments. Here, the method of verification and refinement may be the same as the method for verification and refinement of a box hypothesis that was created by two diagonal corner features. The computing device may determine whether the refined box hypothesis violates predetermined "box dimension constraints" and/or the perpendicularity of the box dimension constraints. Each box may have three different side lengths (e.g., a height, width, and depth), and the "box dimension constraints" refer to lengths of two of these sides that are included in a given box hypothesis. As such, the computing device may determine that a box hypothesis does not violate the box dimension constraints if (i) the lengths of the two sides fall within a predetermined range of lengths associated with the predetermined box dimension constraints (e.g., predetermined based on a multitude of known, different boxes) and/or (ii) the two side lengths substantially match one or more predetermined box dimension constraints. Thus, the only detected box hypotheses that may be considered are box hypotheses that have a given combination of side lengths that (i) are not too small or too large and (ii) substantially match predefined box sizes. If the computing device determines that a refined box violates such constraints, the corresponding box may not be further considered.

At the next module, a background and plane coverage check module, in order to check consistency of all box hypotheses, the computing device may determine whether each box hypothesis covers a significant part of the background and/or more than just one plane. As such, boxes that cover a significant part and/or more than just one place are removed from consideration.

At the next module, an identity check module, the computing device may remove duplicate box hypotheses in order to speed up global reasoning. Namely, the computing device may remove exact duplicates and also may remove box hypotheses which are substantially close to other box hypotheses.

At the last module, a global reasoning module, the computing device determines a more clear interpretation of a given facade. By implementing this module, the computing device can avoid overlapping box hypotheses in the final box detection results. First, however, the computing device may perform local reasoning. Namely, the computing device may determine, for each box hypothesis, whether there is a significant smaller box hypothesis that intersects this box hypothesis and whose depth-only similarity score is high enough to assume that the smaller box hypothesis is an actual box. When there is such a significant smaller box hypothesis, the computing device may determine that the larger box hypothesis is not an actual box and remove it from consideration.

For the global reasoning aspect, the computing device may first extract connected groups of box hypotheses where a box hypothesis belongs to one group if it occludes another box hypothesis within the group or is occluded by another box hypothesis within the group. Each box hypothesis may only belong to one group. For each group the computing device may build a connected undirected graph where two nodes are connected if the two corresponding box hypotheses don't overlap. The computing device may then attempt to find maximal cliques with this graph (i.e., subgraphs where each node (e.g., a box) is connected to all other nodes (e.g., other boxes)). Each clique may be weighted by factors such as the confidence scores of the included box hypotheses, the area of the box hypotheses (e.g., a number of pixels included in the box hypothesis), and the number of box hypotheses that belong to this clique (larger number means higher weighting). For instance, the weight (or "final confidence score") may equal a product of each of those factors. Lastly, the computing device may determine a sorting of all the weighted maximal cliques in decreasing order, and then use the one with the maximum score as a final global result for virtually distinguishing distinct objects in the images. Other examples of segmentation of physical objects are possible as well.

Operations relating to requests for remote assistance will now be discussed in more detail. Such operations may be used in addition to, used as an alternative to, and/or may modify one or more of the operations described above.

Figure 3:
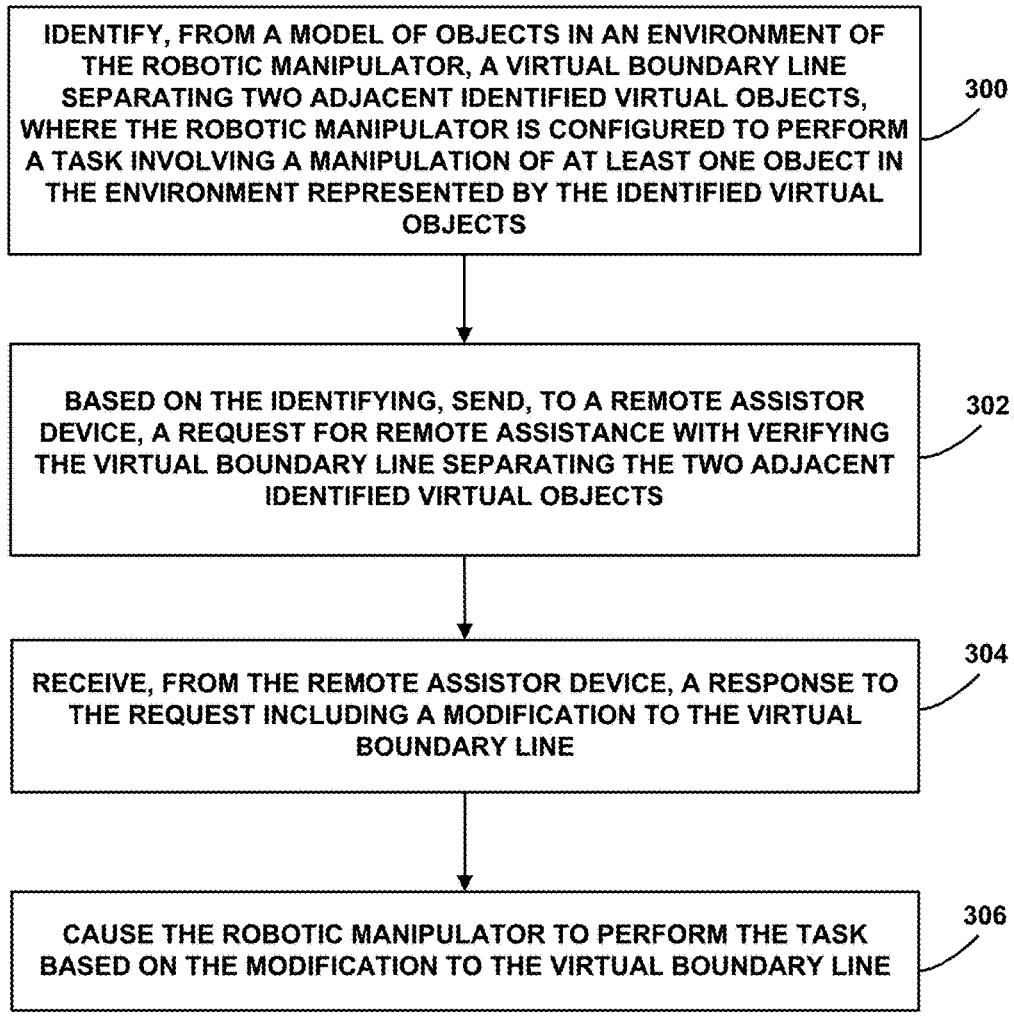
FIG. 3 is a flow chart of an example method, in accordance with at least some implementations described herein.

FIG. 3 is a flow chart of an example method for requesting remote assistance in order to facilitate robotic object manipulation. The method shown in FIG. 3 presents an implementation of a method that, for example, could be used with the systems shown in FIGS. 1A-1B and/or FIGS. 2A-2C, for example, or may be performed by a combination of any components of in FIGS. 1A-1B and/or FIGS. 2A-2C. In addition, such an implementation of a method could be carried out in accordance with the systems and aspects illustrated in FIGS. 4, 6, 7, 8, 9, and 10. The method may include one or more operations, or actions as illustrated by one or more of blocks 300, 302, 304, and 306. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method and other processes and methods disclosed herein, the flowchart shows operation of one possible implementation of present implementations. In this regard, each block may represent a module, a segment, or a portion of program code, which includes one or more instructions executable by one or more processors for implementing specific logical operations or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method and other processes and methods disclosed herein, each block in FIG. 3 may represent circuitry that is wired to perform the specific logical operations in the process.

Operations of this example method, and operations of other methods and processes disclosed herein, may be performed at least in part by a computing device or computing system configured to control a robotic device and/or other components or subsystems (e.g., sensors or another type of robotic vision system located remotely from the system) that are associated with the robotic device, such as control system 140 and/or other subsystems of robotic device 100 described above. Operations of the method may be performed by one or more global control systems, each configured to control and manage at least one robotic device. Additionally or alternatively, operations of the method may be performed by a cloud computing system in communication with a global control system and/or with one or more robotic devices. Additionally or alternatively, operations of the method may be managed by a central server, which can distribute operations to smaller networks or servers that may each manage one or more robotic devices. Some operations of the method may also be described to be performed by a robotic device itself, although such language may refer in actuality to such operations being performed by a control system configured to control the robotic device.

At block 300, the control system identifies, from a model of objects in an environment of the robotic manipulator, a virtual boundary line separating two adjacent identified virtual objects, where the robotic manipulator is configured to perform a task involving a manipulation of at least one object in the environment represented by the identified virtual objects. Herein, a "model" refers to an n-dimensional virtual reconstruction of a physical environment, such as the physical environment of the robotic manipulator that includes one or more objects. Within examples, the model may be a 3D volumetric model of the one or more objects. Within additional examples, the model may be a 2D image of a façade of the one or more objects, such as an orthographically-projected color/intensity image, depth image showing how far away each of a plurality of points in the environment is from the robotic manipulator and/or sensor(s) that captured the image, or normal image, or another type of 2D image.

Furthermore, two "adjacent" objects refer herein to two objects that are positioned next to each other and/or positioned on top of each other such that (i) one or more surfaces of one object directly touch one or more surfaces of the other object or (ii) the two objects do not touch each other but are within a close proximity to each other. More specifically, "a close proximity" is a distance between two objects that is small enough that it could cause the control system to mistakenly perceive the two objects to be a single object. In addition, this definition of "adjacent" also applies to virtual objects identified by a control system in the context of object recognition. In particular, if the control system identifies two "adjacent" virtual objects, the control system perceives these two virtual objects to correspond to two adjacent objects in the environment. In some scenarios, the two virtual objects may correctly correspond to two adjacent objects in the environment. In other scenarios, however, they may not correctly correspond and the control system's perception may be mistaken. For instance, as noted above, the control system may identify two adjacent virtual objects, but they may actually represent more or less than two objects in the environment.

When the model includes numerous objects, it may be advantageous to request remote assistance with distinguishing a region of the model, where the region includes only one or two objects, so that the human assistor can analyze the request and respond more quickly, rather than requesting remote assistance with distinguishing a region of the model that includes more than two objects or with distinguishing the entire model. Accordingly, it may be advantageous to request remote assistance with verifying (e.g., conforming, rejecting, adjusting) the virtual boundary line that indicates to a remote assistor a boundary between what the control system perceives to be two adjacent objects in a region of the model that the control system is interested in (e.g., the objects that the control system plans to manipulate). Within examples, the control system may identify a virtual boundary line separating two identified adjacent virtual objects, and the two virtual objects correspond to two objects in the environment. Within additional examples, however, the control system may identify an erroneous virtual boundary line; the identified virtual boundary line may separate two identified adjacent virtual objects—since the control system perceives there to be two adjacent objects in the environment—when, in actuality, only one object may be in the environment (e.g., the control system perceives a large box to be two or more boxes stacked together). And within additional examples, the identified virtual boundary line may separate two identified adjacent virtual objects, when, in actuality, the model may correspond to only a portion of an object (e.g., the control system perceives a portion of a large box to be two or more boxes stacked together).

In line with these examples, the control system may determine one or more object hypotheses (e.g., a box hypothesis, as described above) within the model that the control system expects to correspond to surfaces of the on more objects bounded by a plurality of edges of each of the objects and/or bounded by a plurality of corners (i.e., two different identified perpendicular edges) of each of the objects. As such, the process of identifying a virtual boundary line may involve identifying multiple virtual boundary lines within the model that correspond to edges and/or corners of what the control system perceives to be one or more objects in the environment. For instance, the control system identifying an object hypothesis may involve the control system identifying multiple virtual boundary lines, or virtual edges of the object, that make up a virtual surface of the object (e.g., four virtual edges of a box hypothesis) and that may indicate boundaries between the object and other possible objects adjacent to the object. Additionally or alternatively, the control system identifying an object hypothesis may involve the control system identifying multiple virtual corners of the object that bound the object and that may indicate boundaries between the object and other possible objects adjacent to the object.

Figure 4:
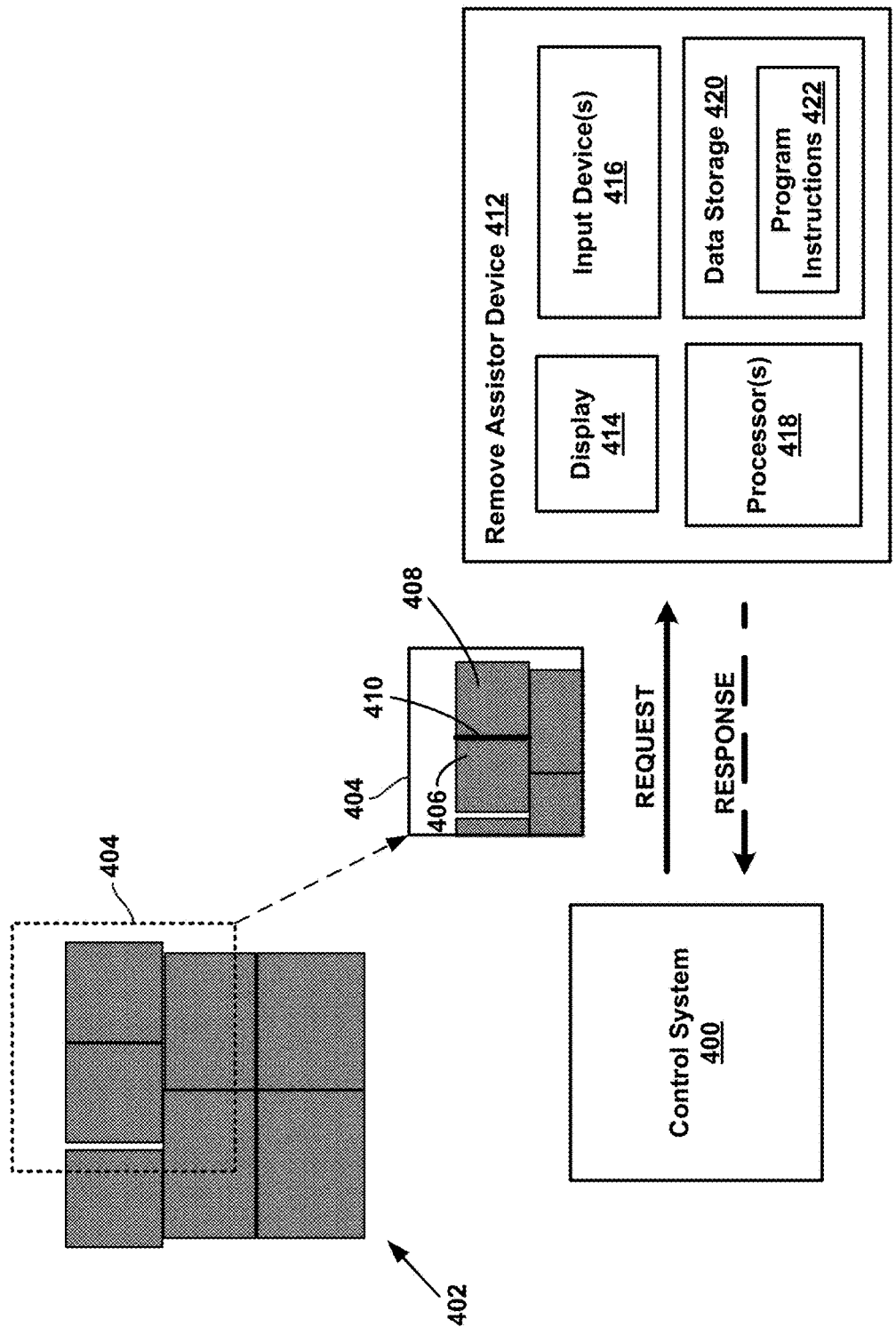
FIG. 4 illustrates an example control system and an example remote assistor device, in accordance with at least some implementations described herein.

FIG. 4 illustrates an example system in which operations of the example method can be performed, in accordance with at least some implementations described herein. As shown in FIG. 4, the control system 400 may determine a model of objects in an environment of a robotic manipulator, namely, a 2D image of a façade of a stack of boxes. In particular, FIG. 4 illustrates a façade-view of a model 402 of a stack of seven boxes and further illustrates a region 404 of the model 402, where the region includes two entire, adjacent virtual boxes 406, 408 separated by an identified virtual boundary line 410, and a portion of three other boxes.

Furthermore, as discussed above, the robotic manipulator (not shown) and/or the control system 400 may be configured to perform a task involving a manipulation of at least one object in the environment represented by the identified virtual objects. For instance, the control system may plan to manipulate at least one box identified in region 404. Accordingly, the control system may identify the virtual boundary line 410 separating two adjacent virtual boxes 406, 408, since the control system perceives there to be two adjacent boxes in that region of the environment. The control system may be arranged to cause the robotic manipulator to perform a task involving a manipulation of the boxes in the environment that correspond to the two adjacent virtual boxes 406, 408, provided that the two adjacent virtual boxes correctly correspond to two actual boxes in the environment on a stack of boxes.

Herein, a "task" refers to an operation that is assigned to at least one entity for that entity or entities to perform. Such a task may be assigned to the at least one entity by a system that monitors, governs, or otherwise manages the at least one entity in order to facilitate a performance of the task by the at least one entity. The system could also assign the task to itself. Consequently, the at least one entity may perform the task entirely on its own or may perform the task in conjunction with the system that assigns the task. In line with the example method, for instance, the control system may assign a task to the robotic manipulator for the robotic manipulator to perform on its own or in conjunction with the control system.

Within examples, in addition to involving a manipulation of at least one object in the environment, a given task may involve the control system identifying the virtual boundary line, as discussed above. Additionally, the given task may involve the control system determining a segmentation of the model (or a region of the model, such as region 404), involving an identification of multiple virtual boundary lines, and then instructing the robotic manipulator to perform the manipulation of objects to which the model corresponds based on the determined segmentation. The control system may identify a virtual boundary line and/or segment the region before a given task is assigned and/or as part of the performance of the given task, since the virtual boundary line and/or the segmentation of the model may enable the control system and/or the robotic manipulator to perform the given task. For instance, the control system may identify a virtual boundary line and/or a segmentation, so as to distinguish object(s) in a region of the model, and then use that virtual boundary line and/or segmentation to identify other information about the object(s), to label the object(s), to grab and move the object(s), etc.

Within additional examples, the given task may involve the control system identifying one or more locations on one or more virtual objects of the region (e.g., before or during the segmentation of the model) and then instructing the robotic manipulator to grip or otherwise interact with the object(s) to which the region corresponds at the identified one or more locations. For instance, the robotic manipulator may couple its gripper to each individual object at one or more respective locations, a forklift robotic manipulator may insert its forks into one or more locations on a pallet of objects so as to lift the pallet, among other possibilities.

Within additional examples, the given task may involve the control system determining a sequenced order in which to perform the manipulation of each object to which the region corresponds and then instructing the robotic manipulator to manipulate the object(s) in the determined order. For instance, after/while/without segmenting the model, the control system may label each virtual object with a number that indicates which object the control system will instruct the robotic manipulator to manipulate first, second, third, etc.

Within additional examples, the given task may involve the control system identifying one or more locations in the environment of the robotic manipulator the control system should place the object(s) and then instructing the robotic manipulator to place each object at the identified one or more locations. For instance, the control system may determine a model of an environment, such as a truck or pallet, in which boxes are to be placed, identify one or more regions in the model that correspond to one or more locations in the truck or on the pallet where the control system is planning to place (e.g., load) each box, and then cause the robotic manipulator to place each box at the one or more locations in the truck or on the pallet. Further, the control system may also determine a sequenced order in which to place the boxes and then cause the robotic manipulator to place each box at the identified one or more locations in a determined sequenced order.

Within additional examples, the given task may involve the control system determining a path along which the robotic manipulator (or another type of robotic device) should move (e.g., drive, slide, rotate, etc.) in order to manipulate objects and/or should move while manipulating a particular object (e.g., a path along which the robotic manipulator should carry and place the particular object). For instance, the control system may determine a path along which a robotic device should travel across the workplace floor in order to arrive at the object(s). The control system could also determine a path along which a forklift may move its forks to one or more locations on a pallet of objects at which the forklift will lift the pallet of objects. Other types of paths are also possible.

Other tasks are possible as well. The tasks described above and/or other tasks may be performed in combination with one another or separate from one another. Further, it should be noted that even when two objects are detected, the task may only involve a manipulation of one of the two objects that the boundary line separates, in some instances. Still further, it should also be noted that in instances where the task involves a manipulation of multiple objects, each object may be manipulated in different manners.

As discussed above, in some scenarios the control system may require or otherwise prefer remote assistance with the performance of a given task, such as a given task that involves identifying a virtual boundary line. By way of example, the control system may be unable to determine a virtual boundary line and may thus request remote assistance. As another example, the control system may be uncertain as to whether the virtual boundary line it has determined is sufficient for enabling the robotic manipulator to manipulate objects in the desired manner, and may thus request remote assistance.

Within examples, the control system may determine a confidence score for the virtual boundary line (and for each other identified virtual boundary line and/or identified object hypothesis, if there are other such identifications made). A confidence score may indicate a level of confidence in whether the virtual boundary line correctly distinguishes the objects in the model, and may take the form of a number value (e.g., one through ten, 0% through 100%, etc.) or another type of data representation, either visual or non-visual. If the control system determines that a confidence score associated to the virtual boundary line is lower than a predetermined confidence threshold, the control system may determine that it should request remote assistance with an identification of the virtual boundary line. On the other hand, if the control system determines that a confidence score associated to the virtual boundary line is greater than the predetermined confidence threshold, the control system may not request remote assistance. Alternatively, the control system may request remote assistance when the respective confidence score is greater than a predetermined threshold and may not request remote assistance when the respective confidence score is lower than the predetermined threshold.

Within examples, the control system may have stored respective different predetermined confidence thresholds, each associated to one or more characteristics of objects that could be detected in the environment. For instance, when a particular lighting, particular object color, etc. is present in the environment and detected by the control system, the control system may determine that it should use a predetermined confidence threshold associated with that characteristic when identifying a virtual boundary line in the model of the objects in the environment. Furthermore, each predetermined confidence threshold may be adjusted automatically or manually. For instance, a predetermined confidence threshold may dynamically decrease as the control system has been trained to identify virtual boundary lines with higher confidence and greater precision and accuracy, based on repeated interaction between the control system and the remote assistor devices. Additionally or alternatively, a human user may provide instructions for the control system to adjust a predetermined confidence score.

Referring back to FIG. 3, at block 302, based on the identifying of the virtual boundary line, the control system sends, to a remote assistor device, a request for remote assistance with verifying the virtual boundary line separating the two adjacent identified virtual objects. Herein, the term "request" refers to data transmitted from a first entity (e.g., the control system) to a second entity (e.g., a remote assistor device) that indicates a request for the second entity to provide the first entity with data associated with the request. Consequently, in some examples, the first entity may also provide additional data as part of the request (or separate from the request) that the second entity can use to (i) determine what type of data the second entity should send in response to the request and/or (ii) determine when the second entity should provide a response to the request.

Referring again to the example system of FIG. 4, the control system 400 may send, to a remote assistor device 412, a request for remote assistance with verifying one or more virtual boundary lines in order to facilitate distinguishing at least one box in the region 404 of the model 402 that the control system is interested in manipulating. As shown, the remote assistor device 412 may include a display 414, one or more input devices 416 (e.g., a touchscreen, keyboard, mouse, microphone, etc.), at least one processor 418, and data storage 420 comprising instructions 422 executable by the at least one processor to cause the remote assistor device to perform operations. The remote assistor device may include other components as well.

The request may include information associated with the virtual boundary line. Within examples, such information may include a confidence score determined for one or more virtual boundary lines. Within additional examples, such information may include instructions executable by at least one processor of the remote assistor device in order to cause the remote assistor device to approve, reject, and/or modify the virtual boundary line. Additionally or alternatively, the information indicative of the virtual boundary line may include instructions executable by at least one processor of the remote assistor device in order to cause the remote assistor device to display a visual representation of at least the region of the model at issue and a visual indication of the virtual boundary line, so as to enable a human user to view and interact with the model, the identified virtual boundary line, and/or other information. For instance, the control system may include, in a given request, instructions that, when processed by the remote assistor device, causes the remote assistor device to display (e.g., on display 414) a graphical user interface (GUI) including graphical elements representative of the model and the virtual boundary line. Accordingly, a human user may use one or more input devices (e.g., input device(s) 416) to interact with the GUI and provide assistance.

The graphical elements may include static and/or adjustable elements. For instance, a static element may include a background of the workplace that a façade of boxes occupies, a visual representation of the control system's confidence score for the identified virtual boundary line, a box hypothesis that the control system has determined with a high confidence score, etc. Adjustable elements may include, for instance, representations of one or more virtual boundary lines (e.g., corners, edges) of box hypotheses that the control system may have determined with a low confidence score. For example, the control system may have correctly determined the locations of three edges of a box hypothesis, but may have incorrectly determined the fourth edge of the box hypothesis. As such, each of the determined edges may be visually presented to the human user as graphical elements on the remote assistor device and the human user may be able to move the fourth edge to the correct corresponding location in the model and "snap" the fourth edge to one of the correctly-determined edges. As another example, the control system may determine a gripping location on a particular box in the model at which the robotic manipulator will manipulate the particular box. As such, the gripping location may be visually presented to the human user as a graphical element on the remote assistor device and the human user may be able to move the gripping location to a more preferable position on the particular box. As yet another example, the control system may determine a path along which the robotic manipulator should move in order to engage in the manipulation of a particular box. As such, the path may be visually presented to the human user as a graphical element on the remote assistor device and the human user may be able to adjust the path. Other examples are possible as well.

Within additional examples, the human user may be able to create new graphical elements and/or delete graphical elements in addition to or alternative to adjusting elements. For instance, the human user may be able to use a touchscreen of the remote assistor device to "draw" (i) a virtual boundary line separating two adjacent identified virtual objects that the control system did not properly distinguish, (ii) a virtual boundary line representing an outer edge or corner of an object, and/or (iii) a box hypothesis around a box or other object that the control system did not detect. The human user may also be able to create labels (e.g., numbers) that the human user can assign to each object in the model when determining a sequenced order in which the robotic manipulator should manipulate the objects. Other examples are possible as well.

Referring back to FIG. 3, at block 304, the control system receives, from the remote assistor device, a response to the request including a modification to the virtual boundary line. And at block 306, the control system causes the robotic manipulator to perform the task based on the modification to the virtual boundary line. In particular, the control system may cause the robotic manipulator to perform the task by sending instructions to the robotic manipulator that includes information indicative of how to perform the task using the modified virtual boundary line. The information indicative of how to perform the task may include information representative of any human user feedback determined by the remote assistor device based on human user input, such as the modification to the virtual boundary line. Within other examples, the human user feedback may include (i) a user-determined box hypothesis, (ii) a user-determined sequenced order in which to manipulate the at least one object of the region of the model, (iii) a user-determined location on each of the objects where the robotic manipulator should manipulate each object of the region, (iv) an indication of user acceptance of a control system-identified virtual boundary line, (v) an indication of user rejection of a control system-identified virtual boundary line, (vi) an indication of user acceptance of a control system-determined segmentation of the region, (vii) an indication of user rejection of a control system-determined segmentation of the region, and/or (viii) an instruction for the control system to rescan the objects in the region (or all the objects in the environment), among other types of labels/information associated to the objects that the control system is interested in.

Within examples, if the identified virtual boundary line corresponds to an actual boundary between two adjacent objects in the environment, the human user may not alter the virtual boundary line at all, and thus the "modification" to the virtual boundary line may include a confirmation that the control system correctly identified the virtual boundary line separating the two adjacent virtual objects. Then, the control system may instruct the robotic manipulator to perform the manipulation of each of the two objects based on the confirmed actual boundary between the two objects. In particular, the control system may instruct the robotic manipulator to manipulate one of the objects at a first time without manipulating the other object, and then proceed to manipulate the other object at a second time. Alternatively, the control system may instruct the robotic manipulator to manipulate both of the two objects at the same time (e.g., pick up two objects at once). Within other examples, the task may not necessarily involve a manipulation of both objects on either side of the confirmed actual boundary, as noted above. Accordingly, the control system may instruct the robotic manipulator to perform the manipulation of one of the two objects without performing a manipulation on the other of the two objects.

Within other examples, if there is actually only one single object in a region of the model but the control system mistakenly identified two adjacent virtual objects separated by a virtual boundary line, the control system may receive, included in the response or separate from the response, an indication that there is only one object in the environment. For instance, the indication may take the form of a rejection or deletion by the human user of the virtual boundary line. Then, the control system may instruct the robotic manipulator to perform the manipulation of the single object.

In line with the discussion above, the control system may use the modified virtual boundary line (and other possible information included in the response) to perform various tasks. Within examples, the control system may use the modified virtual boundary line as a basis for determining a segmentation of the at least one object represented by the identified virtual objects and then instruct the robotic manipulator to perform the manipulation of the at least one object represented by the identified virtual objects based on the determined segmentation. For instance, the control system may attempt to segment the entire model and in doing so may identify various virtual boundary lines in various regions of the model. The control system may then request remote assistance with distinguishing one or more regions of the model, perhaps by prompting the remote assistor devices to provide feedback regarding the accuracy of one or more virtual boundary lines identified in the one or more regions. Within additional examples, the control system may use the modified virtual boundary line to identify one or more locations on the at least one object represented by the identified virtual objects and then instruct the robotic manipulator to grip the at least one object at the one or more locations on each object of the at least one object. For instance, once the control system knows how many boxes are in a particular region of the model based on the modified virtual boundary line (e.g., one box or two boxes), the control system may instruct the robotic manipulator to begin picking up each box, perhaps gripping a first box at an edge (or surface associated to the edge) identified at the location of the modified virtual boundary line. Within additional examples, if the modified virtual boundary line indicates that there are two boxes in a particular region of the model, the control system may use the modified virtual boundary line to determine a sequenced order in which to perform the manipulation of each of the two objects and then instruct the robotic manipulator to perform the manipulation of one of the two objects before performing the manipulation of another of the two objects based on the determined sequenced order.

As noted above, the control system may determine a confidence score associated to the virtual boundary line, indicating a level of confidence in whether the virtual boundary line correctly distinguishes the at least one object in the model. In some implementations, the control system and remote assistor device may engage in a collaborative process with multiple interactions in which the control system updates its confidence in identifying virtual boundary lines based on feedback from the remote assistor device, identifies an updated virtual boundary line based on the feedback, and requests additional feedback from the remote assistor device regarding the updated virtual boundary line. In practice, the control system may communicate back and forth with the remote assistor device at least two times in this manner before ultimately instructing the robotic manipulator to perform the task, in order to optimize the control system learning from the feedback received from the remote assistor device. Within examples, after a response is received from the remote assistor device, but before the control system instructs the robotic manipulator to perform the task, the control system may (i) update the confidence score to indicate a level of confidence in whether the modified virtual boundary line correctly distinguishes the at least one object in the model (e.g., increase or decrease the confidence score based on how the human user modified the virtual boundary line), (ii) send to the remote assistor device a second request for remote assistance with verifying the modified virtual boundary line and further including information indicative of the updated confidence score, and (iii) receive, from the remote assistor device, a second response to the request including an updated modification to the virtual boundary line. Then, after receiving the second response, the control system may instruct the robotic manipulator to perform the task based on the updated modification to the virtual boundary line.

Furthermore, in some implementations, the control system may maintain and adjust records associated with the remote assistor device and/or human users that operate the remote assistor device. In particular, the control system may use responses received from the remote assistor device and the resulting performance of tasks as a basis for determining and adjusting such records to reflect increases and decreases in the usefulness of feedback from the remote assistor device. For instance, such records may include remote assistor ratings, or other task performance statistics, that indicate whether the robotic manipulator has correctly performed tasks based on information included in each of the responses that the control system has received from the remote assistor device (e.g., responses provided by human users operating the remote assistor devices) for those tasks. Within examples, responsive to the control system instructing the robotic manipulator to perform the task based on the modification to the virtual boundary line, the control system may modify a remote assistor rating associated to the remote assistor device based on whether the robotic manipulator correctly performed the task using the modification to the virtual boundary line. The control system may notify the remote assistor device of the modified remote assistor rating.

Remote assistor ratings and other task performance statistics may represent human assistor performance at various levels of granularity. Within examples, the given remote assistor device's remote assistor rating may be 50%, which indicates that control system receives feedback from the remote assistor device that causes the robotic manipulator to correctly perform tasks 50% of the time (e.g., a 50% success rate). Within additional examples, the control system may (i) maintain a running total of how many objects the robotic manipulator has correctly manipulated in accordance with the tasks, based on responses that the control system has received from the remote assistor device, and (ii) determine the remote assistor device's remote assistor rating based on the running total of objects.

Within additional examples, task performance statistics may indicate a percentage of each type of task the robotic manipulator has correctly performed based on information included in responses received from the remote assistor device. For instance, if the robotic manipulator performed only 20% of a task based on a response from the remote assistor device (e.g., in a subset of five boxes, the human user correctly identified one box hypothesis and incorrectly identified four other box hypotheses) and 20% is below a predetermined threshold task-completion percentage, the control system may lower the remote assistor device's remote assistor rating.

Within additional examples, task performance statistics may indicate an amount of time taken by the robotic manipulator to perform each task based on the information included in the responses received from the remote assistor device. For instance, if the robotic manipulator performed a task correctly, but took longer than a predetermined threshold amount of time to perform the task (e.g., due to an incorrect box hypothesis identified by the human user, due to a sequenced order determined by the user that caused boxes to fall down, etc.), the control system may lower the remote assistor device's remote assistor rating.

Within additional examples, task performance statistics may indicate an amount of time taken by the human user to provide a response via the remote assistor device to the control system. For instance, if the human user exceeded a predetermined threshold amount of time and took too long to provide assistance with a task in a timely manner, perhaps impeding robotic operation by causing the task or other tasks to be performed incorrectly or performed later than expected, the control system may lower the remote assistor device's remote assistor rating. The remote assistor ratings and other task performance statistics may take other forms as well, and the control system may also be configured to increase a user's/device's task performance statistics and ratings based on performance data exceeding the thresholds discussed above.

The control system may use remote assistor ratings and other task performance statistics in various ways. Within examples, the control system may use remote assistor ratings and other task performance statistics as competition statistics in a game-like scenario. For instance, in some implementations of the example method, human users operating multiple remote assistor devices in a local network (e.g., local to a warehouse) and/or a wider-area network (e.g., across multiple warehouses, across a particular corporation, statewide, nationwide, worldwide, etc.) may compete against each other to provide the most helpful and timely responses to remote assistance requests received from the control system and/or other control systems. In such implementations, the control system may locally and/or globally rank human users based on their task performance statistics and provide notifications to each remote assistor device so that each human user can see the task performance statistics of other human users.

Figure 5:
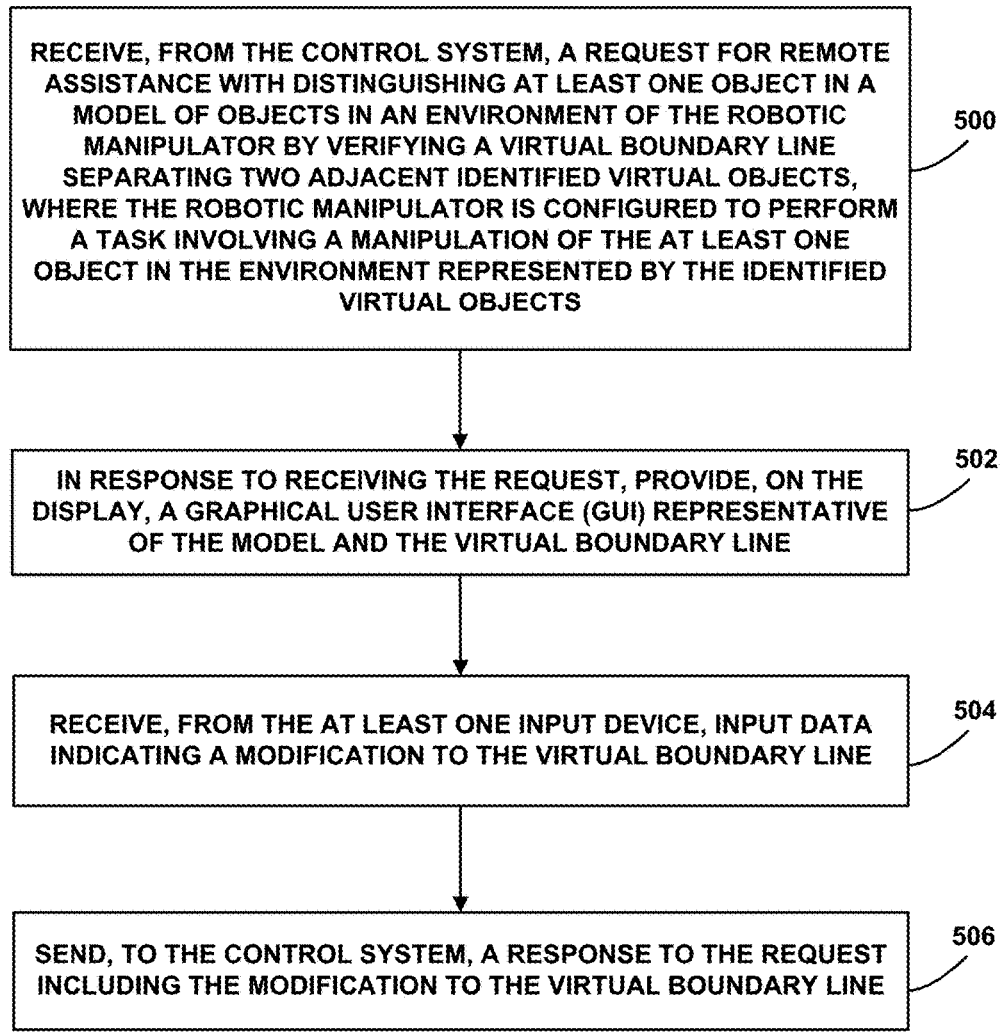
FIG. 5 is a flow chart of another example method, in accordance with at least some implementations described herein.

After the control system sends the request for remote assistance, the remote assistor device may perform various operations. Accordingly, FIG. 5 is a flow chart of another example method, namely, a method performed at least in part by a remote assistor device (e.g., remote assistor device 412) in order to facilitate robotic object manipulation. In particular, the remote assistor device at issue may include at least one input device (e.g., input device(s) 416), a display (e.g., display 414), at least one processor (e.g., processor(s) 418) and data storage (e.g., data storage 420) comprising program instructions (e.g., program instructions 422) executable by the at least one processor, among other possible components.

The method shown in FIG. 5 presents an implementation of a method that, for example, could be used with the systems shown in FIGS. 1A-1B and/or FIGS. 2A-2C, for example, or may be performed by a combination of any components of in FIGS. 1A-1B and/or FIGS. 2A-2C. In addition, such an implementation of a method could be carried out in accordance with the systems and aspects illustrated in FIGS. 4, 6, 7, 8, 9, and 10, and in accordance with the method shown in FIG. 3. The method may include one or more operations, or actions as illustrated by one or more of blocks 500, 502, 504, and 506. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In line with the discussion above, at block 500, the remote assistor device receives, from the control system, a request for remote assistance with distinguishing at least one object in a model of objects in an environment of the robotic manipulator by verifying a virtual boundary line separating two adjacent identified virtual objects, where the robotic manipulator is configured to perform a task involving a manipulation of the at least one object in the environment represented by the identified virtual objects.

At block 502, in response to receiving the request, the remote assistor device provides, on its display, a graphical user interface (GUI) representative of the model and the virtual boundary line. Generally, the remote assistor device may provide visual data of the objects in the environment, and the model is one such example. Additionally or alternatively to providing a model of the objects, the remote assistor device may provide (after receiving it from the control system) a camera image of the objects in the environment. In other examples, the remote assistor device may provide a synthesized visual representation combining a camera image of the objects and a depth map of the objects. Other visual data associated with the objects in the environment is possible as well to enable the human user to provide useful feedback.

The GUI may include one or more of the graphical elements described above. The remote assistor device may provide a GUI including a 2D view of the model and/or a 3D view of the model, each of which may include a depth map of the objects. Within examples, the remote assistor device may provide one or more 2D images of a façade of the objects from respective viewpoints, a static 3D model, and/or a rotatable (or otherwise adjustable and/or navigable) 3D model, such as a 3D model that a human user can zoom in on or zoom out from and can rotate about one or more axes. Within such examples, each visual representation of the objects may be navigated or adjusted in size by the human user (e.g., zoom in, zoom out, pan, etc.) via the at least one input device of the remote assistor device, such as a touchscreen. Further, within such examples, each visual representation of the objects may include a visual indication of the virtual boundary line identified by the control system.

Within additional examples, the GUI may include a prompt for the human user to select whether the virtual boundary line correctly corresponds to a boundary between two adjacent objects or whether the virtual boundary line was incorrectly identified (e.g., when there is only one object in the region of the model at issue and the control system perceived there to be two adjacent objects). The GUI may include other prompts as well, such as prompts to perform other aspects of the task at issue (e.g., a prompt to label a sequenced order in which to manipulate the objects).

At block 504, the remote assistor device receives, from the at least one input device, input data indicating a modification to the virtual boundary line. As noted above, the at least one input device may take various forms, such as a touchscreen, mouse, keyboard, and/or microphone, among other possibilities. In an example implementation, when the at least one input device includes a touchscreen, a human user may provide a touch input indicative of a swipe or other touch gesture on the touchscreen in order to modify the virtual boundary line. For instance, the virtual boundary line (i.e., a graphical element representative of the virtual boundary line) may be displayed at a first position upon receiving the request from the control system, and the human user may then swipe to "click and drag" the virtual boundary line to a second position, thereby adjusting the virtual boundary line. The human user may use various touch gestures to decrease or increase the size of the virtual boundary line, and/or rotate the virtual boundary line. In response to receiving input data that modifies the virtual boundary line, the remote assistor device may provide an update to the GUI for display that is representative of any modifications made to the virtual boundary line, or perhaps to the model (e.g., if the model is rotated or otherwise altered).

At block 506, the remote assistor device sends, to the control system, a response to the request including the modification to the virtual boundary line. In line with the discussion above, the response may include instructions executable by the control system to cause the robotic manipulator to perform the task based on the modification to the virtual boundary line.

Figure 6:
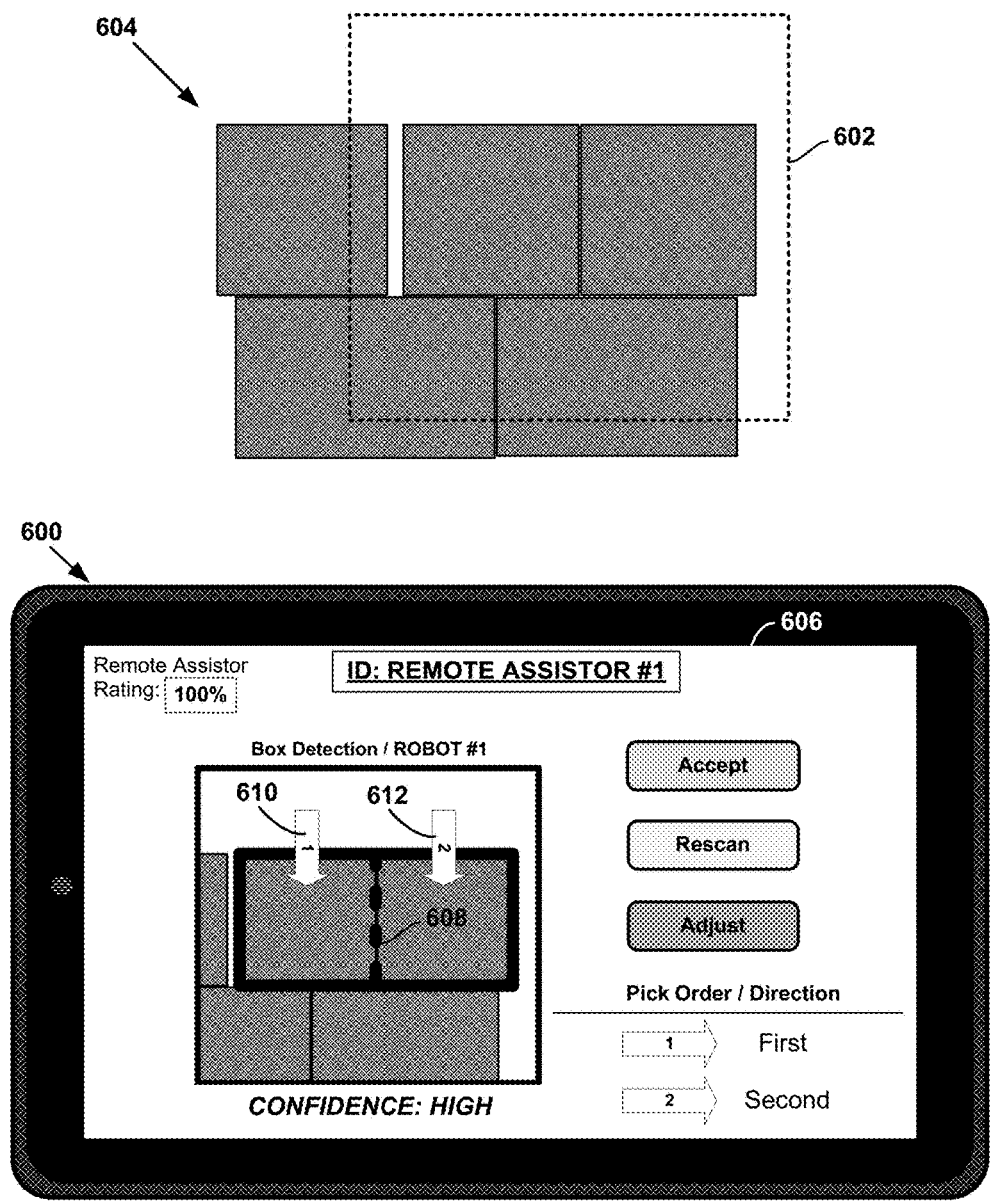
FIG. 6 illustrates an example interface of a remote assistor device, in accordance with at least some implementations described herein.

The manner in which a remote assistor device can provide information to human users for facilitate responses to remote assistance will now be illustrated in more detail. FIG. 6 illustrates an example interface of a remote assistor device, in accordance with at least some implementations described herein. In particular, FIG. 6 illustrates a remote assistor device 600 that has received a request to distinguish boxes in region 602 of a model 604 of objects. As shown, region 602 represents two boxes and a portion of each of three other boxes. The remote assistor device is shown as a tablet computing device with a touchscreen GUI 606.

The GUI 606 includes an indication of the task for which the control system requested remote assistance (e.g., "Box Detection"), an indication of a user identifier of the human user operating the remote assistor device 600 (e.g., "REMOTE ASSISTOR #1"), as well as an indication of which robotic device in the workplace will be performing at least a portion of the task (e.g., "ROBOT #1"). In this case, ROBOT #1 may manipulate at least the two boxes at issue in region 602, based on human user feedback. The GUI also includes a visual representation of region 602, box hypotheses that the control system determined for region 602, a virtual boundary line 608 separating two adjacent virtual boxes, and a confidence score associated with the virtual boundary line (e.g., "CONFIDENCE: HIGH"). In some scenarios, however, the GUI may include only a visual indication of the virtual boundary line 608 and not a visual indication of other identified edges and/or corners of the boxes in region 602 (i.e., other portions of identified box hypotheses). Further, the GUI includes an option for the human user to (i) "Accept" the virtual boundary line 608 identified by the control system for region 602, (ii) instruct the control system to "Rescan" and thereby determine new virtual boundary lines (e.g., by rescanning the entire set of boxes represented by the model 604 or merely rescanning region 602), or (iii) "Adjust" the virtual boundary line 608. Still further, the GUI includes a current remote assistor rating for REMOTE ASSISTOR #1 (e.g., 100%). In scenarios where the control system maintains records associated with remote assistor device performance, as noted above, the control system may provide the remote assistor device with data representative the remote assistor device's remote assistance rating. Based on that data, the remote assistor device may provide a visual indication of the remote assistor device for display, as shown in GUI 606.

Furthermore, the GUI 606 includes movable graphical elements 610, 612 overlaying the image of region 602, which take the form of arrows with respective numbers. As shown in the "Pick Order/Direction" portion of the GUI, the arrows correspond to (i) the order in which a particular box will be picked by ROBOT #1 and (ii) where on the particular box ROBOT #1 should grip the particular box, since the task at issue may involve both determining a sequenced order in which to pick the two boxes of region 602 and determining a location on each of the two boxes at which to cause ROBOT #1 to grip the box and remote the box from the stack. Accordingly, in the scenario illustrated in FIG. 6, if the human user has accepted virtual boundary line 608 (which the human user may be likely to do since the virtual boundary line was identified by the control system with high confidence) or if the human user has adjusted the virtual boundary line 608 to correspond to where the actual boundary between the two boxes is located, the human user may "click and drag" each arrow to a particular box and adjust an orientation of each arrow based on which surface of the particular box the human user believes ROBOT #1 should grip the particular box. For instance, as shown, arrow 610 is placed so as to indicate to the control system that the left box should be picked up and removed off the stack first and gripped on its top surface, and arrow 612 is placed so as to indicate to the control system that the right box should be picked up and removed off the stack second and gripped on its top surface.

Figure 7:
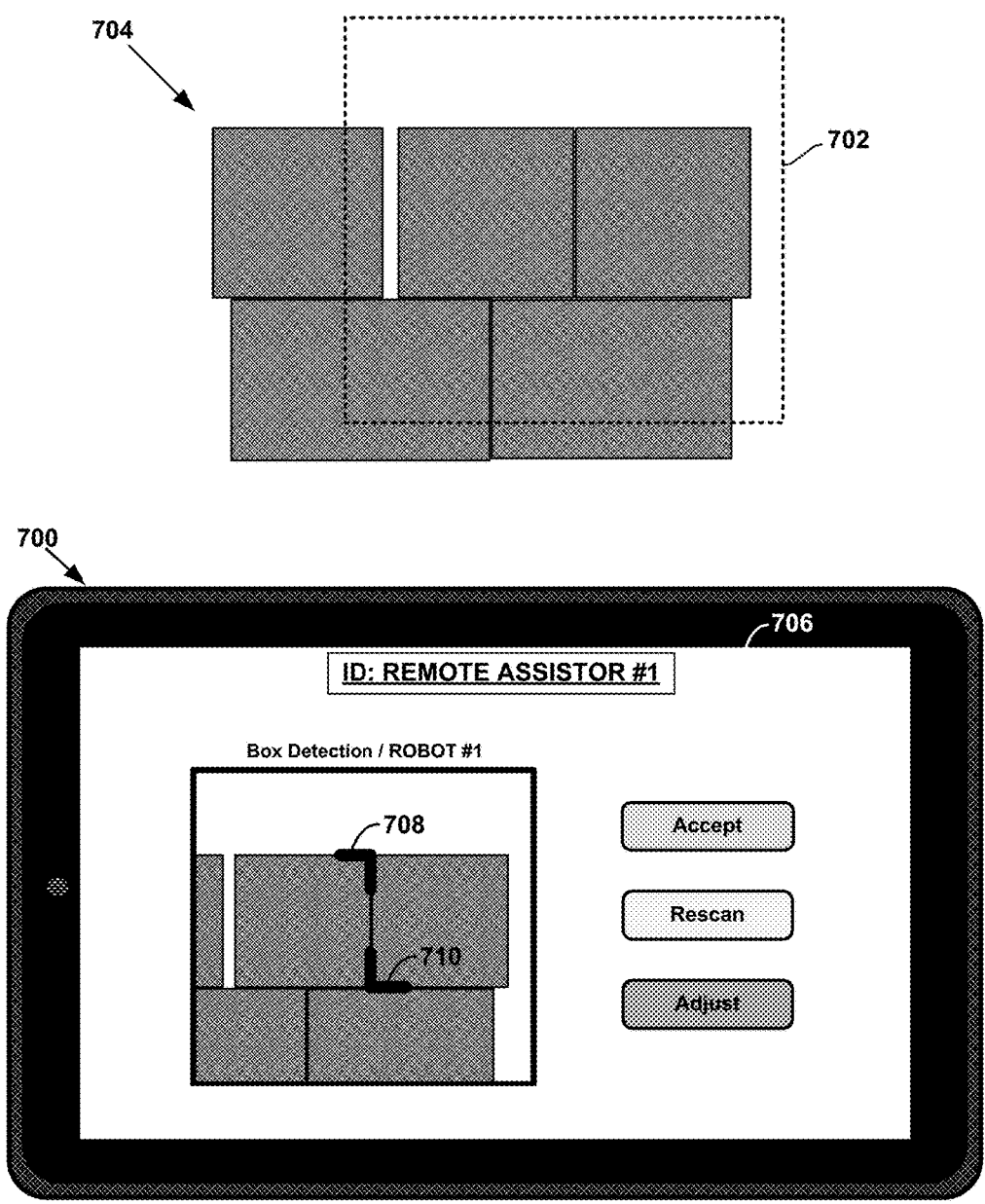
FIG. 7 illustrates an example interface of a remote assistor device, in accordance with at least some implementations described herein.

FIG. 7 illustrates another example interface of a remote assistor device, in accordance with at least some implementations described herein. In particular, FIG. 7 illustrates a remote assistor device 700 that has received a request to distinguish boxes in region 702 of a model 704 of objects, similar to region 602 of model 604 shown in FIG. 6. As shown, the GUI 706 of the remote assistor device includes two corner virtual boundary lines 708, 710 identified by the control system that correspond to a top right corner of the left box and a bottom left corner of the right box. Similar to virtual boundary line 608 in FIG. 6, a human user may accept, reject, or adjust one or both of the virtual corners 708, 710 so as to enable the control system to instruct the robotic manipulator to manipulate each of the two boxes. However, by identifying and providing corners to the remote assistor device, the control system can enable the human user adjust two perpendicular virtual boundary lines simultaneously.

Figure 8:
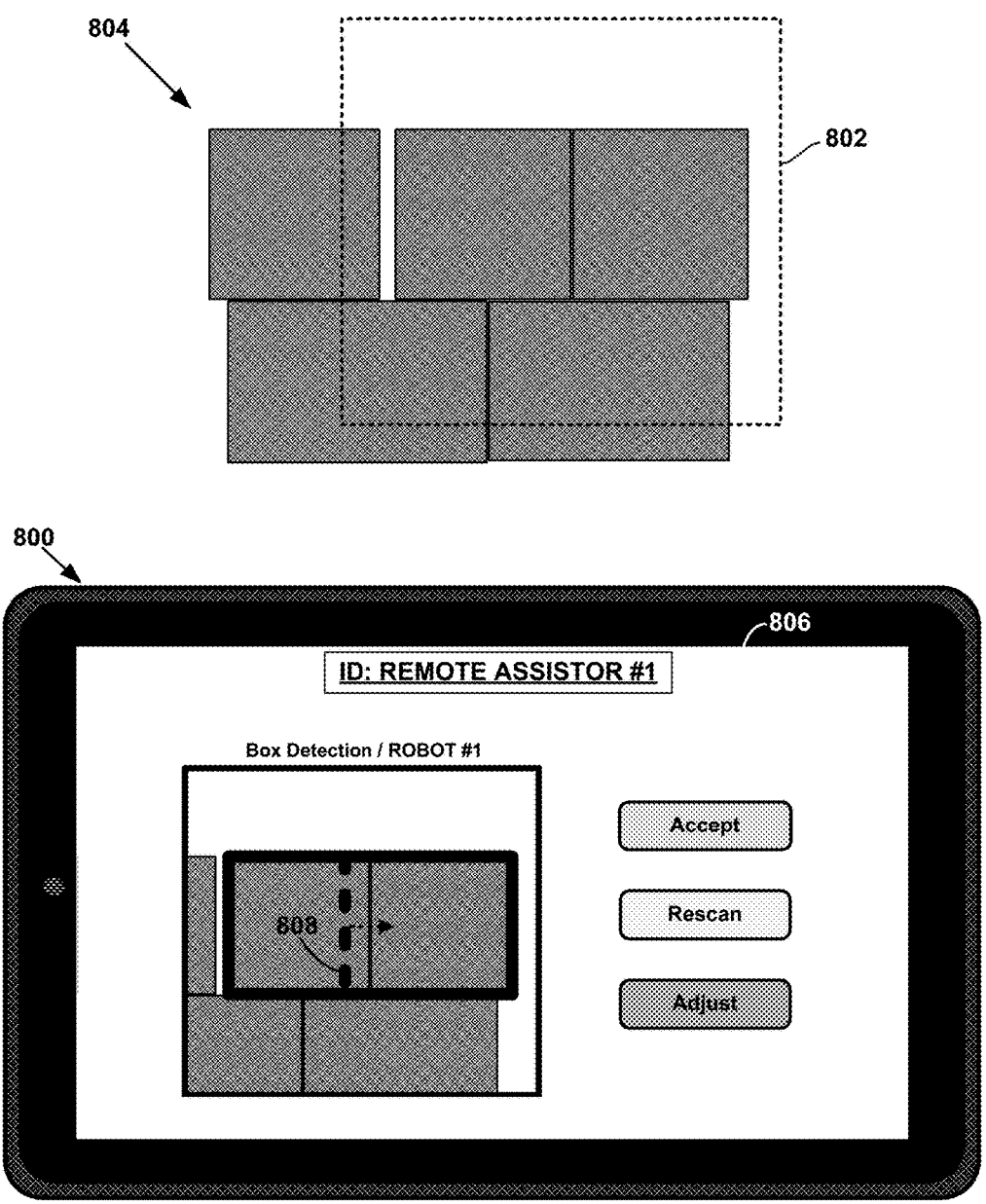
FIG. 8 illustrates an example interface of a remote assistor device, in accordance with at least some implementations described herein.

FIG. 8 illustrates another example interface of a remote assistor device, in accordance with at least some implementations described herein. In particular, FIG. 8 illustrates a remote assistor device 800 that has received a request to distinguish boxes in region 802 of a model 804 of objects, similar to region 602 of model 604 shown in FIG. 6 and region 702 of model 704 shown in FIG. 7. As shown, the GUI 806 of the remote assistor device includes a virtual boundary line 808 identified by the control system that does not correctly correspond to an actual boundary between the two adjacent boxes. In this scenario, a human user may select the option to "Adjust" the virtual boundary like 808 and then proceed to drag the virtual boundary line to the right until it corresponds to the actual boundary, so as to enable the control system to instruct the robotic manipulator to manipulate each of the two boxes.

Figure 9:
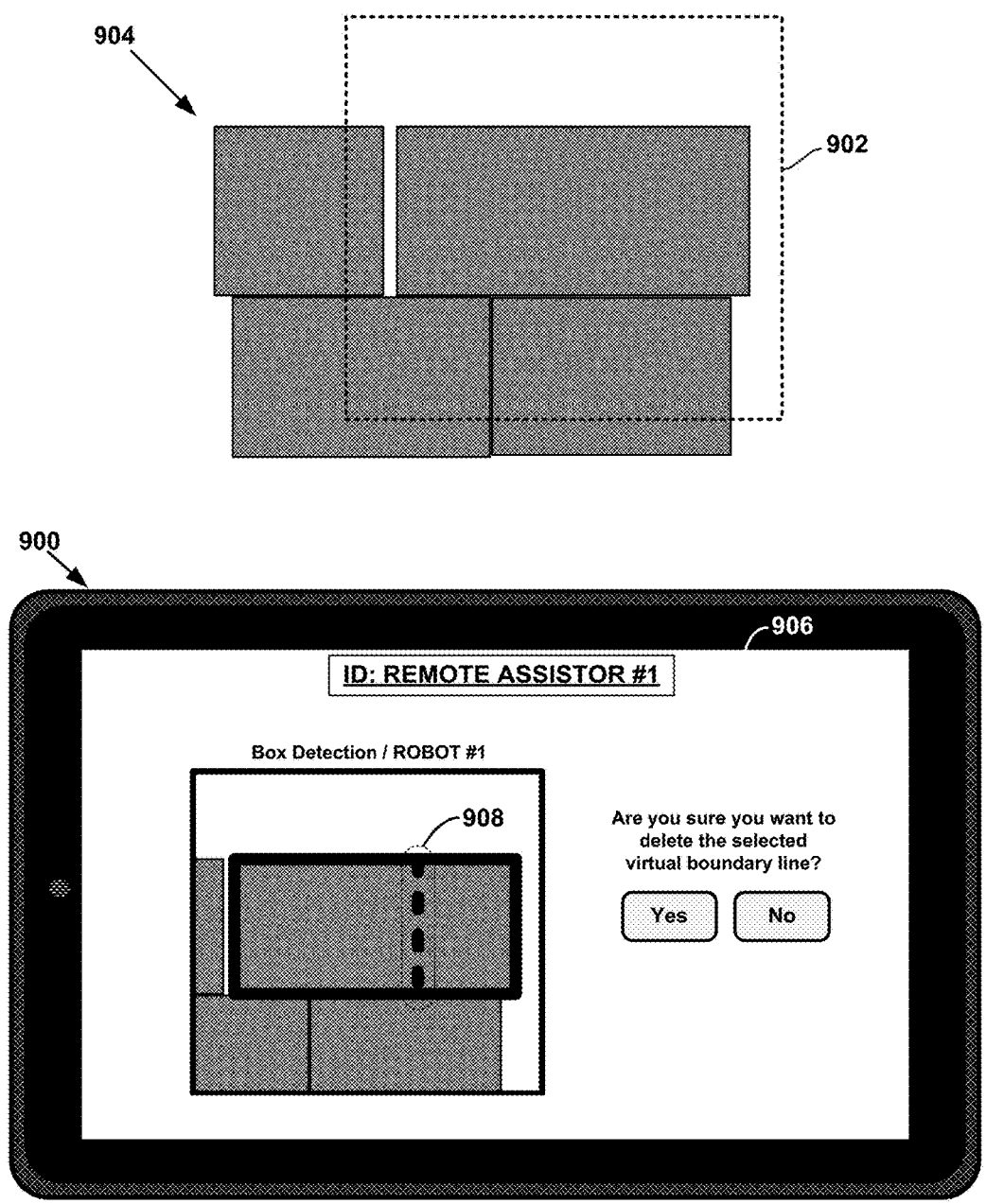
FIG. 9 illustrates an example interface of a remote assistor device, in accordance with at least some implementations described herein.

FIG. 9 illustrates another example interface of a remote assistor device, in accordance with at least some implementations described herein. In particular, FIG. 9 illustrates a remote assistor device 900 that has received a request to distinguish boxes in region 902 of a model 904 of objects. However, in this particular example, instead of detecting the single, large, elongated box in region 902, the control system may have mistakenly perceived the single large box to be two adjacent boxes (e.g., because of tape and/or creases present on the box). Accordingly, as shown, the GUI 906 of the remote assistor device includes a virtual boundary line 908 identified by the control system that does not correspond to an actual boundary between two adjacent boxes because there is only one large box. In this scenario, a human user may select the virtual boundary line 908 in some manner and the remote assistor device may responsively provide for display a prompt to delete the selected virtual boundary line. Upon deletion of the virtual boundary line 908, the remote assistor device may send a response to the control system indicating the deletion of the virtual boundary line, which may in turn cause the control system to instruct the robotic manipulator to manipulate the large box.

Figure 10:
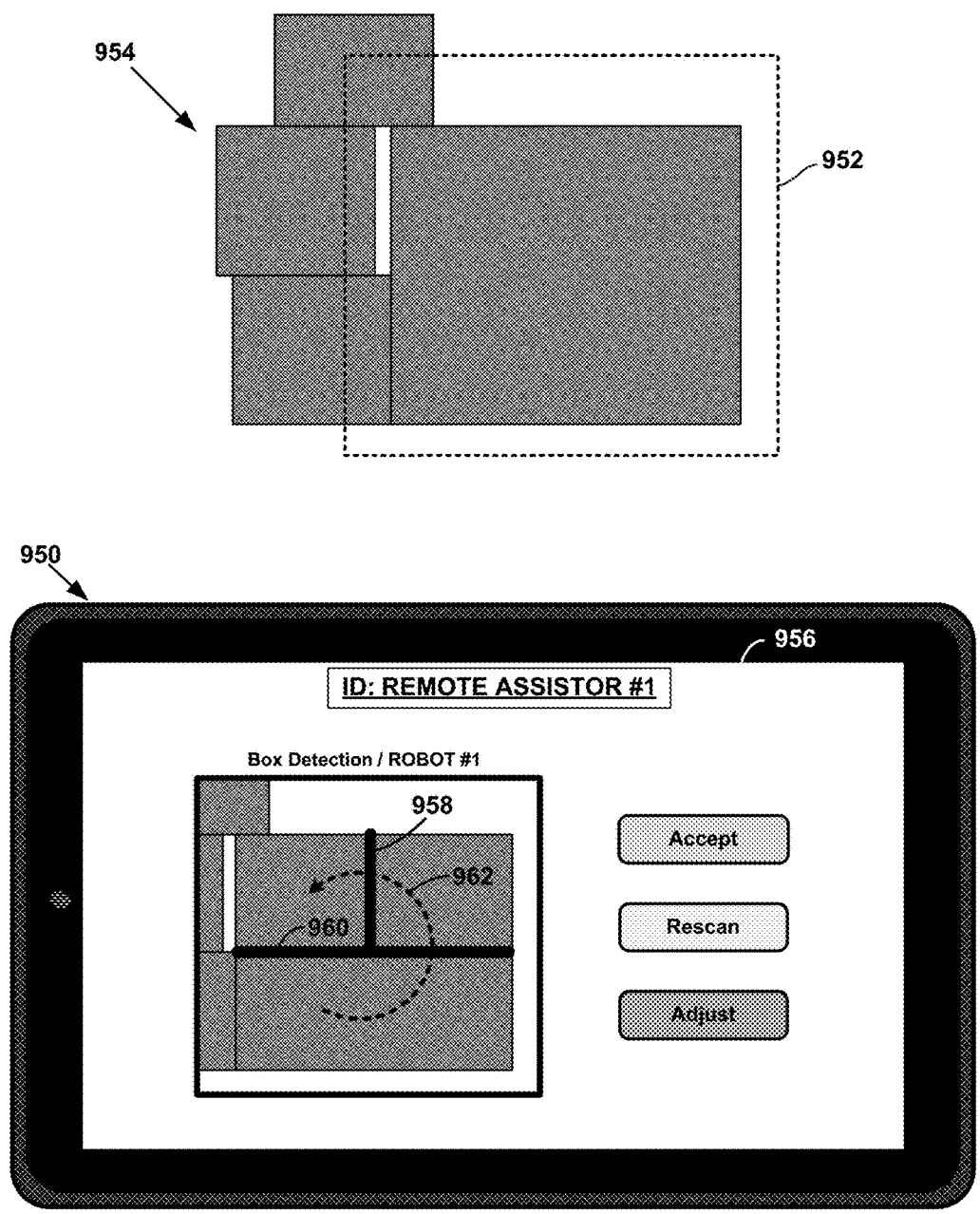
FIG. 10 illustrates an example interface of a remote assistor device, in accordance with at least some implementations described herein.

FIG. 10 illustrates another example interface of a remote assistor device, in accordance with at least some implementations described herein. In particular, FIG. 10 illustrates a remote assistor device 950 that has received a request to distinguish boxes in region 952 of a model 954 of objects. However, in this particular example, instead of detecting the single, large box in region 952, the control system may have mistakenly perceived the single large box to be two adjacent small boxes stacked on top of a larger, elongated box. Accordingly, as shown, the GUI 956 of the remote assistor device includes two virtual boundary lines: (i) virtual boundary line 958 separating identified two small adjacent virtual boxes and (ii) virtual boundary line 960 separating the identified two small adjacent virtual boxes from the identified larger, elongated virtual box. In this scenario, the remote assistor device may enable the human user to touch along path 962, which forms part of a circle and passes through each virtual boundary line 958, 960, and may interpret this touch input as a command to delete the virtual boundary lines and thus "merge" the multiple identified virtual boxes into a single large virtual box that correctly corresponds to the single large box in region 952. Other methods of deleting virtual boundary lines and merging virtual hypotheses are possible as well. Upon deletion of the virtual boundary lines 958, 960, the remote assistor device may send a response to the control system indicating the deletion of the virtual boundary lines, which may in turn cause the control system to instruct the robotic manipulator to manipulate the large box.

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are operational entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A computing system for controlling a robotic manipulator, the computing system comprising:
at least one processor; and
data storage comprising instructions executable by the at least one processor to cause the computing system to perform operations comprising:
identifying, from a model of objects in an environment of the robotic manipulator, a virtual boundary line separating two adjacent identified virtual objects, wherein the robotic manipulator is configured to perform a task involving a manipulation of at least one object in the environment represented by the identified virtual objects;
based on the identifying, sending, to a remote assistor device, a request for remote assistance with verifying the virtual boundary line separating the two adjacent identified virtual objects, wherein the request includes information indicative of the virtual boundary line, wherein the remote assistor device is configured to display a graphical user interface (GUI) that overlays the virtual boundary line on the model, and wherein the GUI allows for (i) a confirmation of the virtual boundary line and (ii) a modification to the virtual boundary line;
receiving, from the remote assistor device, a response to the request, wherein the response comprises one of (i) the confirmation of the virtual boundary line and (ii) the modification to the virtual boundary line; and
causing the robotic manipulator to perform the task based on the response.

2. The computing system of claim 1, wherein the information indicative of the virtual boundary line includes, for display on the remote assistor device, (i) a visual representation of at least a portion of the model and (ii) a visual indication of the virtual boundary line.

3. The computing system of claim 1, wherein the at least one object in the environment include two objects,
wherein the response comprises the confirmation of the virtual boundary line,
wherein the confirmation of the virtual boundary line includes a confirmation that the virtual boundary line corresponds to an actual boundary between the two objects, and
wherein causing the robotic manipulator to perform the task based on the response comprises causing the robotic manipulator to perform the manipulation of each of the two objects based on the confirmed actual boundary between the two objects.

4. The computing system of claim 1, the operations further comprising:
receiving an indication that the at least one object is a single object; and
causing the robotic manipulator to perform the manipulation of the single object.

5. The computing system of claim 1, the operations further comprising:
determining a confidence score associated to the virtual boundary line, wherein the confidence score indicates a level of confidence in whether the virtual boundary line correctly distinguishes the at least one object in the model, wherein sending the request for remote assistance is based at least in part on the determined confidence score being less than a predetermined confidence threshold.

6. The computing system of claim 5, wherein the response comprises the modification to the virtual boundary line, the operations further comprising:
after receiving the response from the remote assistor device and before causing the robotic manipulator to perform the task:
updating the confidence score to indicate a level of confidence in whether the modification to the virtual boundary line correctly distinguishes the at least one object in the model;
sending, to the remote assistor device, a second request for remote assistance with distinguishing the at least one object in the model, wherein the second request includes information indicative of the modification to the virtual boundary line and further includes information indicative of the updated confidence score; and
receiving, from the remote assistor device, a second response to the request including an updated modification to the virtual boundary line; and
causing the robotic manipulator to perform the task based on the updated modification to the virtual boundary line.

7. A method comprising:
identifying, from a model of objects in an environment of a robotic manipulator, a virtual boundary line separating two adjacent identified virtual objects, wherein the robotic manipulator is configured to perform a task involving a manipulation of at least one object in the environment represented by the identified virtual objects;
based on the identifying, sending, to a remote assistor device, a request for remote assistance with distinguishing the at least one object in the model, wherein the request includes information indicative of the virtual boundary line separating the two adjacent identified virtual objects, wherein the remote assistor device is configured to display a graphical user interface (GUI) that overlays the virtual boundary line on the model, and wherein the GUI allows for (i) a confirmation of the virtual boundary line and (ii) a modification to the virtual boundary line;
receiving, from the remote assistor device, a response to the request, wherein the response comprises one of (i) the confirmation of the virtual boundary line and (ii) the modification to the virtual boundary line; and
causing the robotic manipulator to perform the task based on the response.

8. The method of claim 7, wherein identifying the virtual boundary line comprises identifying a virtual edge of one of the identified virtual objects,
wherein the response comprises the modification to the virtual boundary line,
wherein the modification to the virtual boundary line includes a modification to the virtual edge, and
wherein causing the robotic manipulator to perform the task based on the response comprises causing the robotic manipulator to manipulate the at least one object based on the modification to the virtual edge.

9. The method of claim 7, wherein identifying the virtual boundary line comprises identifying two different perpendicular virtual edges that make up a virtual corner of one of the identified virtual objects, wherein the response comprises the modification to the virtual boundary line,
wherein the modification to the virtual boundary line includes a modification to the virtual corner, and
wherein causing the robotic manipulator to perform the task based on the response comprises causing the robotic manipulator to manipulate the at least one object based on the modification to the virtual corner.

10. The method of claim 7, wherein identifying the virtual boundary line comprises identifying four different virtual edges that make up a virtual single surface of one of the identified virtual objects,
wherein the response comprises the modification to the virtual boundary line,
wherein the modification to the virtual boundary line includes a modification to the virtual single surface, and
wherein causing the robotic manipulator to perform the task based on the response comprises causing the robotic manipulator to manipulate the at least one object based on the modification to the virtual single surface.

11. The method of claim 7, wherein the response comprises the modification to the virtual boundary line, the method further comprising:
in response to causing the robotic manipulator to perform the task based on the response, determining a modified remote assistor rating associated to the remote assistor device, wherein the modifying is based on whether the robotic manipulator correctly performed the task based on the modification to the virtual boundary line; and
providing, to the remote assistor device, a notification of the modified remote assistor rating.

12. The method of claim 7, wherein the response comprises the modification to the virtual boundary line, wherein causing the robotic manipulator to perform the task comprises, (i) using the modification to the virtual boundary line to identify one or more locations on the at least one object represented by the identified virtual objects and (ii) causing the robotic manipulator to grip the at least one object at the one or more locations on each object of the at least one object.

13. The method of claim 7, wherein the response comprises the modification to the virtual boundary line, wherein the at least one object in the environment include two objects, and
wherein causing the robotic manipulator to perform the task comprises, (i) using the modification to the virtual boundary line to determine a sequenced order in which to perform the manipulation of each of the two objects and (ii) causing the robotic manipulator to perform the manipulation of one of the two objects before performing the manipulation of another of the two objects based on the determined sequenced order.

14. The method of claim 7, wherein the response comprises the modification to the virtual boundary line, wherein causing the robotic manipulator to perform the task comprises, (i) using the modification to the virtual boundary line to determine a segmentation of the at least one object represented by the identified virtual objects and (ii) causing the robotic manipulator to perform the manipulation of the at least one object represented by the identified virtual objects based on the determined segmentation.

15. A remote assistor computing device for providing remote assistance to a control system of a robotic manipulator, the remote assistor computing device comprising:

a display;

at least one processor; and data storage comprising instructions executable by the at least one processor to cause the remote assistor computing device to perform operations comprising:

receiving, from the control system, a request for remote assistance with distinguishing at least one object in a model of objects in an environment of the robotic manipulator, wherein the request includes information indicative of a virtual boundary line separating two adjacent identified virtual objects, and wherein the robotic manipulator is configured to perform a task involving a manipulation of the at least one object in the environment represented by the identified virtual objects;

in response to receiving the request, providing, on the display, a graphical user interface (GUI) representative of the model and the virtual boundary line, wherein the virtual boundary line is overlaid on at least a portion of the model, and wherein the GUI allows for (i) a confirmation of the virtual boundary line and (ii) a modification to the virtual boundary line;

receiving, via the GUI, input data indicating one of (i) the confirmation of the virtual boundary line and (ii) the modification to the virtual boundary line; and sending, to the control system, a response to the request, wherein the response comprises the one of (i) the confirmation of the virtual boundary line and (ii) the modification to the virtual boundary line, wherein the control system is configured to control the robotic manipulator to perform the task based on the response.

16. The remote assistor computing device of claim 15, wherein the response further includes instructions executable by the control system to cause the robotic manipulator to perform the task based on the one of (i) the confirmation of the virtual boundary line and (ii) the modification to the virtual boundary line.

17. The remote assistor computing device of claim 15, wherein providing the GUI comprises providing a two-dimensional (2D) image of a façade of the objects in the environment, wherein the 2D image includes a visual indication of the virtual boundary line and further includes one or more of: (i) visual data associated with the objects in the environment and (ii) a depth map of surfaces of the objects in the environment.

18. The remote assistor computing device of claim 15, wherein providing the GUI comprises providing a three-dimensional (3D) view of the model, wherein the 3D view of the model includes a visual indication of the virtual boundary line and further includes one or more of: (i) visual data associated with the objects in the environment and (ii) a depth map of surfaces of the objects in the environment.

19. The remote assistor computing device of claim 15, wherein providing the GUI comprises providing a rotatable three-dimensional (3D) view of the model including a visual indication of the virtual boundary line.

20. The remote assistor computing device of claim 15, wherein providing the GUI comprises providing a prompt to select whether the at least one object in the model represents (i) a single object in the environment or (ii) two objects in the environment.

21. The remote assistor computing device of claim 15, the operations further comprising:

in response to receiving the input data via the GUI, providing, on the display, an update to the GUI, the update being representative of the modification to the virtual boundary line.

22. The remote assistor computing device of claim 15, wherein the display includes a touchscreen, and wherein receiving the input data indicating the modification to the virtual boundary line comprises receiving touch input indicative of a swipe on the touchscreen from a current position of the virtual boundary line to a second position, the operations further comprising:

in response to receiving the input data via the GUI, (i) adjusting the virtual boundary line to the second position and (ii) providing, on the display, an update to the GUI, the update being representative of the adjustment to the virtual boundary line.

23. The remote assistor computing device of claim 15, wherein the response comprises the modification to the virtual boundary line, the operations further comprising:

in response to sending the response to the control system, receiving, from the control system, data representative of a remote assistor rating, wherein the remote assistor rating indicates whether the robotic manipulator correctly performed the task based on the modification to the virtual boundary line; and based on the data, providing a visual indication of the remote assistor rating on the display as part of the GUI.

* * * * *